(12) United States Patent
Saroiu et al.

(10) Patent No.: US 12,061,559 B2
(45) Date of Patent: Aug. 13, 2024

(54) PREVENTION OF RAM ACCESS PATTERN ATTACKS VIA SELECTIVE DATA MOVEMENT

(71) Applicant: Microsoft Technology Licensing, LLC, Redmond, WA (US)

(72) Inventors: Stefan Saroiu, Redmond, WA (US); Alastair Wolman, Seattle, WA (US); Lucian Cojocar, Bellevue, WA (US); Kevin Robert Loughlin, Ann Arbor, MI (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/089,879

(22) Filed: Dec. 28, 2022

(65) Prior Publication Data

US 2023/0129255 A1 Apr. 27, 2023

Related U.S. Application Data

(63) Continuation of application No. 17/006,565, filed on Aug. 28, 2020, now Pat. No. 11,567,880.

(60) Provisional application No. 63/064,779, filed on Aug. 12, 2020.

(51) Int. Cl.
*G06F 12/14* (2006.01)
*G06F 12/0893* (2016.01)
*G06F 12/1009* (2016.01)
*G06F 21/55* (2013.01)

(52) U.S. Cl.
CPC ...... *G06F 12/1425* (2013.01); *G06F 12/0893* (2013.01); *G06F 12/1009* (2013.01); *G06F 21/556* (2013.01); *G06F 2212/1052* (2013.01)

(58) Field of Classification Search
CPC ............ G06F 12/1425; G06F 12/0893; G06F 12/1009; G06F 2212/1052; G06F 21/556
See application file for complete search history.

(56) References Cited

U.S. PATENT DOCUMENTS

| 10,019,350 | B1* | 7/2018 | Lee ................. G11C 11/4076 |
| 2015/0279441 | A1* | 10/2015 | Greenberg ........... G11C 11/406 365/49.1 |
| 2017/0287547 | A1* | 10/2017 | Ito ........................ G11C 29/72 |

(Continued)

OTHER PUBLICATIONS

N/A, "Preventing Row Hammer Attacks by Dynamic Indirection of Row Addresses", Technical Disclosure Commons, (Jun. 24, 2020) https:/www.tdcommons.org/dpubs_ series/3361 (Year: 2020).*

*Primary Examiner* — Michael Krofcheck

(57) ABSTRACT

Aspects of the present disclosure relate to techniques for minimizing the effects of RowHammer and induced charge leakage. In examples, systems and methods for preventing access pattern attacks in random-access memory (RAM) are provided. In aspects, a data request associated with a page table may be determined to be a potential security risk and such potential security risk may be mitigated by randomly selecting a memory region from a subset of memory regions, copying data stored in a memory region associated with a page table entry in the page table to the second memory region, disassociating the second memory region from the subset of memory regions and associating the memory region associated with the page table to the second memory region, and updating the page table entry in the page table to refer to the second memory region.

20 Claims, 17 Drawing Sheets

(56) References Cited

U.S. PATENT DOCUMENTS

| | | | |
|---|---|---|---|
| 2019/0056874 A1* | 2/2019 | Lee | G06F 3/0652 |
| 2019/0065079 A1* | 2/2019 | Lee | G06F 11/1666 |
| 2020/0380130 A1* | 12/2020 | Purushotham | G06F 21/566 |
| 2021/0303683 A1* | 9/2021 | Elad | G06F 21/554 |
| 2021/0319834 A1* | 10/2021 | Sharifi Tehrani | G11C 7/1045 |
| 2022/0019363 A1* | 1/2022 | Periyaeluvan | G06F 3/0673 |

* cited by examiner

PREVENTION OF RAM ACCESS PATTERN ATTACKS VIA SELECTIVE DATA MOVEMENT

CROSS REFERENCE TO RELATED APPLICATIONS

This application is a continuation of U.S. patent application Ser. No. 17/006,565, filed on Aug. 28, 2020, which claims the benefit of U.S. Provisional Application No. 63/064,779, filed on Aug. 12, 2020, and titled "PREVENTION OF RAM ACCESS PATTERN ATTACKS VIA SELECTIVE DATA MOVEMENT", the contents of all are incorporated herein by reference in their entirety.

BACKGROUND

Maintaining the integrity of data stored in random-access memory (RAM) is important, not only in the context of reliability, but also for security considerations. However, in some instances, RAM may be susceptible to induced charge leakage (also known as RAM disturbances), which may cause one or more bits of the RAM to "flip" or change from their original value in response to other activity in the RAM. Such charge leakage may result in data loss or corruption, or may introduce potential security issues (e.g., if the bits relate to memory access permissions, are outside of an applications sandbox, etc.).

It is with respect to these and other general considerations that embodiments have been described. Also, although relatively specific problems have been discussed, it should be understood that the embodiments should not be limited to solving the specific problems identified in the background.

SUMMARY

Aspects of the present disclosure relate to techniques for preventing induced charge leakage in random-access memory (RAM) which may cause data corruption. Such attacks are often referred to as RowHammer attacks. More specifically, the present disclosure provides mechanisms for probabilistically identifying aggressor rows and/or hot rows and moving and/or remapping the contents of the aggressor rows and/or hot rows to other areas of RAM in order to prevent induced charge leakage in nearby victim rows. In examples, the detection of an aggressor row and the movement of data to potentially mitigate the aggressor row may be performed in software. Accordingly, rather than needing new or upgraded hardware to protect against RowHammer and/or other induced charge leakage attacks, data move operations in software may be utilized to mitigate such attacks or security risks.

In accordance with examples of the present disclosure, a method for preventing access pattern attacks in random-access memory (RAM) is provided. The method may include determining that a data request associated with a page table is a potential security risk and mitigating the potential security risk by selecting a memory region from a subset of memory regions, copying data stored in a memory region associated with a page table entry in the page table to the second memory region, disassociating the second memory region from the subset of memory regions and associating the memory region associated with the page table to the second memory region, and updating the page table entry in the page table to refer to the second memory region.

In accordance with examples of the present disclosure, a method for preventing access pattern attacks in a random-access memory (RAM) array is provided. The method may include determining that a data request associated with a random-access memory (RAM) array is a potential security risk and mitigating the potential security risk by: selecting a first row in the RAM array, the first row storing the data requested, receiving the data in a row buffer, selecting a second row from a set of rows, disassociating the second row from the set of rows, storing the data located in the buffer to the second row, and associating the first row with the set of rows.

In accordance with examples of the present disclosure, a memory controller comprising processor executable instructions is provided. The processor executable instruction, when executed by a processor, may cause the memory controller to determine that a first address associated with-access memory (RAM) is a potential security risk, mitigate the potential security risk by: selecting a second address associated with the RAM from a set of available RAM addresses, storing data retrieved from the first address into the second RAM address, disassociating the second RAM address from the set of available RAM addresses, and associating the first address to the set of RAM addresses.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

Figure 1:
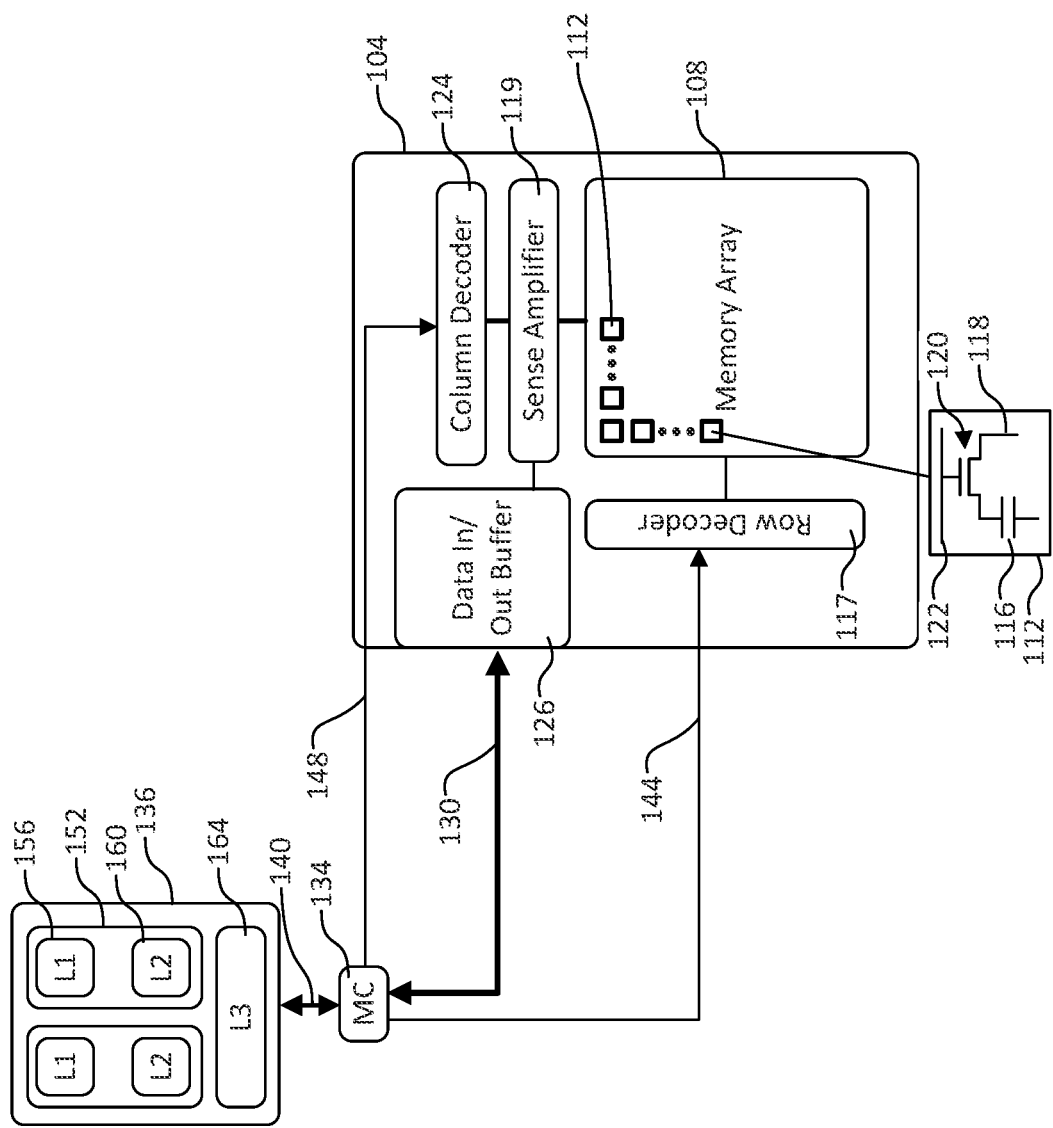
FIG. 1 depicts an example of dynamic random-access memory (DRAM) module together with a central processing unit (CPU) in accordance with examples of the present disclosure.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems, or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

Data stored on random-access memory devices may be organized into arrays of rows and columns. An example of a RAM device includes but is not limited dynamic random-access memory (DRAM), magnetoresistive random-access memory (MRAM), spin transfer torque magnetic random access memory (STT-RAM), and synchronous DRAM (SDRAM). In memories that rely on the storage characteristics of a capacitor to store a charge, such as DRAM, repeatedly applying current on one row via activation commands can induce current on a nearby row, thereby affecting the charge of capacitors (and the associated bits) of the nearby row. Accordingly, RAM access patterns in one region of RAM has the potential to affect other regions. In some instances, such regions may be otherwise inaccessible to the software generating the RAM access patterns (e.g., as a result of software protections, processor-level protections, etc.). Accordingly, not only does induced charge leakage result in the potential for lost or corrupted information, but it poses a security risk where software is able to avoid or potentially circumvent memory protections. Such issues are also relevant in the cloud computing context, where multiple tenants may use the same computing resources (e.g., storage, processors, memory, etc.). Moreover, as memory becomes denser, the spacing between capacitors as well as the thickness of insulating material between capacitors decreases, which decreases the number of row activations needed to discharge an adjacent capacitor and alter the intended capacitor state (e.g., '0' or '1').

Accordingly, aspects of the present disclosure relate to reducing the susceptibility of stored information in a RAM device to induced charge leakage. For example, the concept of RowHammer involves using an access pattern to target information residing in a victim row by one or more nearby aggressor rows; a RAM access pattern may be repeatedly applied to the aggressor rows in order to cause the charge in one or more capacitors of the victim row to leak and therefore flip from '1' to a '0' as an example. A refresh command may be used to cause a RAM device to rewrite data in each cell, for example by restoring capacitors to their original charge and thereby retaining the data represented by the charged and uncharged capacitors. However, because the number of activations required to flip a bit is decreasing as RAM becomes denser, RAM remains susceptible to induced charge leakage caused by high rates of row activations. In accordance with examples of the present disclosure, by moving contents of a suspected or identified aggressor row to another location (e.g., within the RAM device or a separate device), the likelihood of a induced charge leakage caused by a high number of intentional row activations in nearby rows can be reduced, if not eliminated altogether.

In accordance with examples of the present disclosure, data residing at a first RAM location may be accessed, or read, and may be moved to a memory location. In examples, the second location is associated with a memory pool, or collection of memory. The memory pool may be equal to a percentage or portion of the overall available memory for storage. In order to effectuate the data move, system software, a memory controller, and/or DRAM logic may communicate to update a memory map that indicates a mapping between a physical address provided by the processor and the actual memory location (e.g., rank, bank, phase, row, and column). Because the location of an aggressor row may move, the possibility of induced charge leakage (and therefore, a RowHammer attack) is drastically reduced. That is, because the data is not in a fixed location for an amount of time needed to conduct a RowHammer attack or otherwise induce charge leakage, there is insufficient electromagnetic disturbance between aggressor row(s) and victim row(s) to successfully carry out a RowHammer attack. In some examples, a configuration setting may determine whether data is to be moved and the address is to be remapped. That is, a portion of an overall memory, or a portion of the memory associated with a process or user may be selectively protected from RowHammer attacks and induced charge leakage.

In accordance with examples of the present disclosure, an aggressor row may be identified such that the data associated with the aggressor row may be moved to another location. The present disclosure introduces a probabilistic mechanism for identifying aggressor rows. Namely, each row may be associated with a small aggressor probability p, such that each activation of a row will trigger a potential aggressor row determination. In some examples, the potential aggressor row determination may be based on a probability p. The probability can be fixed across all rows, or vary per-row with the use of hardware and/or software state. For example, at an activation time, a random number may be generated; of this random number is greater than a threshold (e.g., probability) for that particular row, then the row may be identified as a potential aggressor row and may be moved as described herein. In some examples, a potential aggressor row may be identified utilizing a counter-based identification process; more specifically, the counter-based identification process may identify frequently accessed memory rows, also known as a hot row. If a number of activations is greater than a threshold, or a frequency of activations is greater than another threshold, the row may be identified as a potential aggressor row and the potential aggressor row may be moved to a random memory location. In accordance with some examples, the identification of a potential aggressor row may be performed for each row, or performed at a predetermined time (e.g., rows accessed at a specific time may be identified as a potential aggressor row). Accordingly, the row, as a potential aggressor row, may be moved to another location in memory. While aspects of this disclosure describe prevention of malicious attacks, such as RowHammer attack, the various aspects disclosed herein can also be employed to protect against inductive charge leakage that may arise from non-malicious use, such as induced charge leakage that may occur due to frequent access of a hot row.

Rather than proactively refresh neighboring rows as is common with existing RowHammer mitigation techniques, examples of the present disclosure may relocate the identified potential aggressor row such that electromagnetic disturbances caused by the potential aggressor row are insufficient to induce charge leakage to corrupt an intended victim row. That is, rather than spending resources to identify a potential victim being targeted by an aggressor row, moving a row identified as a potential aggressor row presents a more efficient solution as many potential aggressor rows may be identified using the counter-based identification process disclosed above. Moreover, depending upon the implementation, the identification of the potential aggressor row and the subsequent mitigation may be performed by the memory controller and/or RAM device, by the system software, by the memory controller, or by the RAM device as needed to manage data movement. That is, the movement of the potential aggressor row may be performed using only software such that there is no need to modify the hardware design of existing RAM in order to provide protection from RowHammer attacks and/or induced charge leakage. In some examples, such movement of data may also work to reduce or eliminate side-channel attacks as well.

In some examples, the data in a row may be moved directly by RAM logic. In some examples, a memory controller sitting between a processor and the RAM device may initiate the data move and maintain a data mapping. Yet, in other instances, an operating system may move or otherwise duplicate data from RAM and update a corresponding entry in a page table. In some examples, the data movement and mapping operations may be based on whether a process utilizes a portion of memory and/or whether an account has such a configuration enabled. That is, a user may wish to disable the data movement operations at certain periods of time.

FIG. 1 depicts an example of DRAM module 104 together with a central processing unit (CPU) 136 in accordance with examples of the present disclosure. The DRAM module 104 uses many cells to store information, wherein each DRAM cell stores a bit of information represented via a capacitor 116. As depicted in FIG. 1, DRAM cells 112 are typically arranged in rows and columns to form a DRAM array 108. Each DRAM cell 112, may include a capacitor 116 used to store a bit of information and a transistor 120 used to read and write to the capacitor 116. Each DRAM cell 112 may be located, or otherwise accessed via the row decoder 117 and the column decoder 124. That is, a CPU 136 including multiple cores 152 and multiple caches 156, 160, and 164, may access a DRAM cell 112 of the DRAM array 108 via a memory controller 134, where the memory controller may translate or otherwise map a memory location provided by the CPU 136 to one or more rows and columns in the DRAM array 108.

For example, the CPU 136 may provide a 'physical' address to the memory controller 134; the physical address does not directly specify the address lines, or rows and columns, of the DRAM array 108. Rather, the 'physical address' provided by the CPU 136 is mapped to the location of the data stored in the DRAM array 108. For example, it may be difficult to determine which DRAM module 104 and which DRAM cells 112 are being referenced by a physical address of 0x004A4800. Accordingly, when the CPU 136 transacts data from DRAM, the memory controller 134 is responsible for fulfilling that request. The memory controller 134 takes the physical address passed to it by the CPU 136 and addresses the relevant location in the DRAM module 104. As one example, the CPU 136 may issue a load instruction to retrieve a word at the 'physical address' of 0x004A4800. The memory controller 134 may then translate, or map, the 'physical address' to a specific location in a specific DRAM module 104. The memory controller 134 may provide channel selection, rank selection, bank selection, row selection, and column selection information to the DRAM module 104 via one or more of the data lines 148 and 144. As an example, the memory controller may request that the DRAM module 104 provide the words from rank 0, bank 0, row 8192, column 1019. Based on the information received from the memory controller, the row decoder 117 may provide a current through the select line 122 of the DRAM cell 112 for example, causing the transistor 120 acting as a switch to close such that the charge stored in the capacitor 116 flows to the data line 118. The sense amplifier 119 may detect the resulting charge on the data line 118 and amplify the charge such that the column decoder 124 may select the correct columns based on the address information provided by the memory controller 134. Accordingly, the column information may be provided to a buffer 126 and provided back to the memory controller 134 via the bus 130. The memory controller 134 may then provide the 'word' requested by the CPU 136 via the data bus 140 to the CPU 136.

Figure 2:
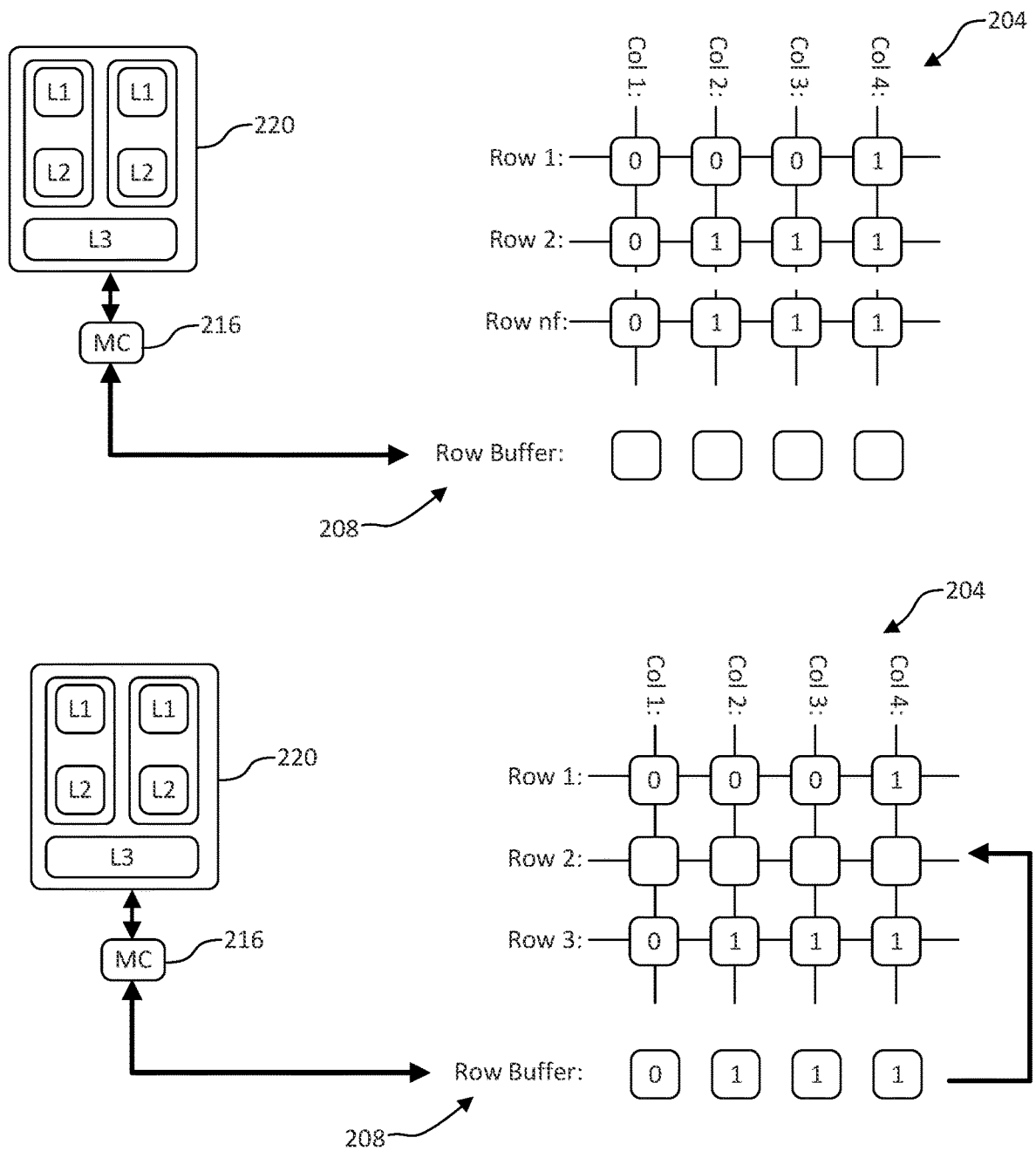
FIG. 2 depicts additional details directed reading contents of a memory array in accordance with examples of the present disclosure.

FIG. 2 depicts additional details directed reading contents of a RAM array, such as a DRAM array 204, in accordance with examples of the present disclosure. More specifically, the CPU 220 may request information associated with a 'physical address' as previously described. The memory controller 216 may translate or otherwise map the 'physical address' to a specific location in the DRAM array 204. Accordingly, the DRAM device may activate a selected row, such as row 2, causing the contents of row 2 to be written to the row buffer 208. However, in some instances upon reading the selected row, such as row 2, the capacitors in the selected row may become discharged. Accordingly, a write back command may be issued by the DRAM device causing the contents of the row buffer 208 to be written back to the corresponding row, such as row 2. Multiple activations of and write backs may render an ordinary row, such as row 2, into an aggressor row or hot row.

Figure 3:
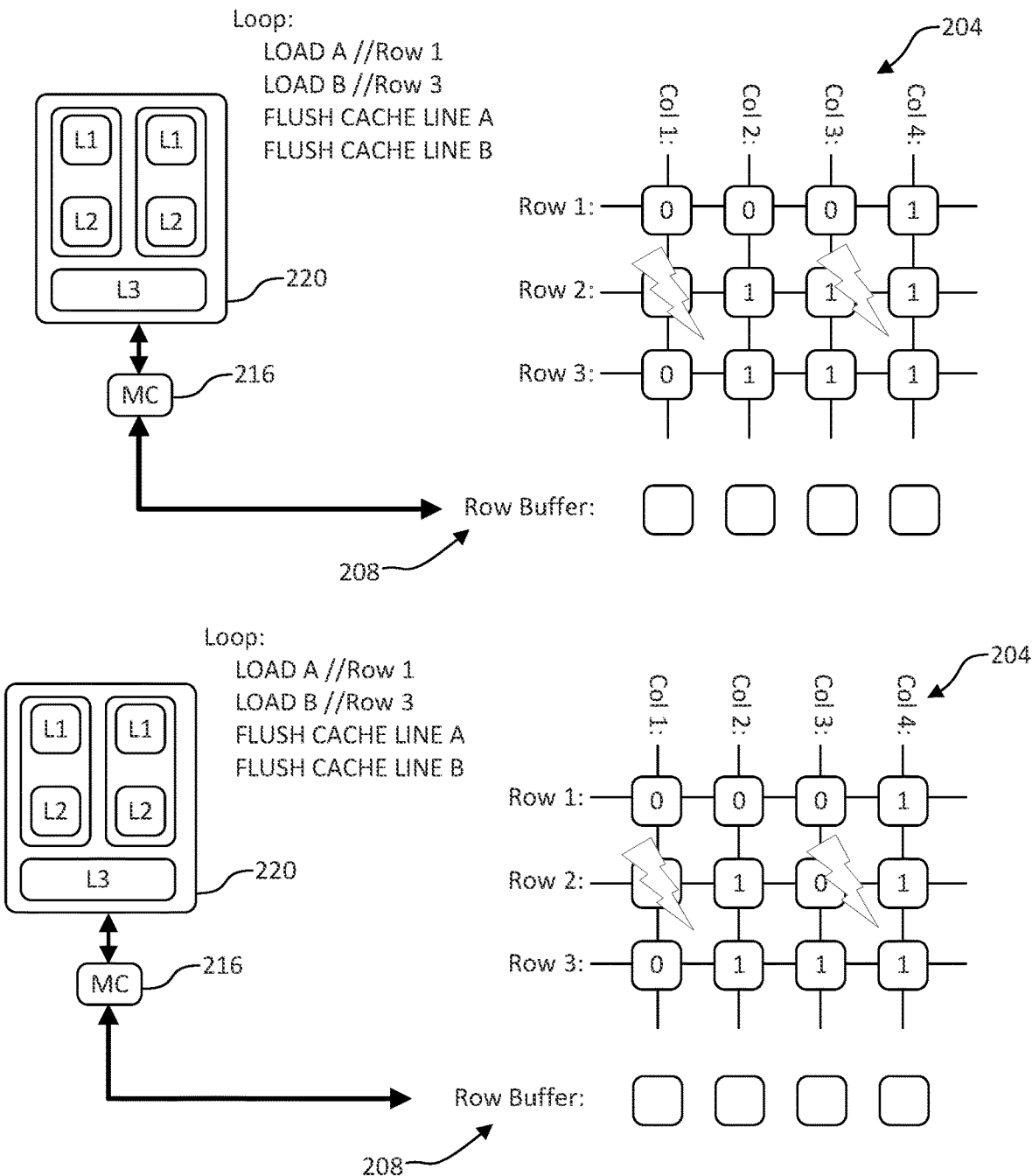
FIG. 3 depicts additional details directed to a RowHammer attack intentionally designed to cause induced charge leakage and flip a bit or otherwise corrupt information stored in a row in accordance with examples of the present disclosure.

FIG. 3 depicts additional details directed to a RowHammer attack intentionally designed to cause induced charge leakage and flip a bit or otherwise corrupt information stored in row 2. More specifically, row 2 in the DRAM array 204 may be considered to be the victim row. Row 1 and/or rows 1 and 3 may be considered to be the aggressor rows and may intentionally target the victim row (e.g., row 2) to cause a bit in row 2 to flip. By repeatedly activating row 1 and row 3, for example, using a loop with a specific activation pattern, one or more of the bits in row 2 may be flipped. That is, the repeated activation of row 1 and row 3 may cause a capacitor in a memory unit of row 2 to discharge such that a previously stored charge representing a logic high or '1' is now a logic low or '0'. As depicted in FIG. 3, the capacitor associated with col. 1, row 2 and the capacitor associated with col. 3, row 2 has flipped from a logic high or '1' to a logic low or '0', thereby corrupting the information stored in row 2. Examples of the present disclosure may reduce and/or prevent the corruption of data due in part to induced charge leakage (e.g., via RowHammer attacks or exploits). For example, by identifying a suspected aggressor row, such as row 1 or row 3, and then moving the suspected aggressor row to a different location in the DRAM array 204, the electromagnetic disturbances caused by row 1 and row 3 can be limited and/or reduced. Moreover, the data in row 1 and/or row 3 may be moved to a random location in the DRAM array 204 such that the victim, row 2, becomes more difficult to purposefully target.

Figure 4A:
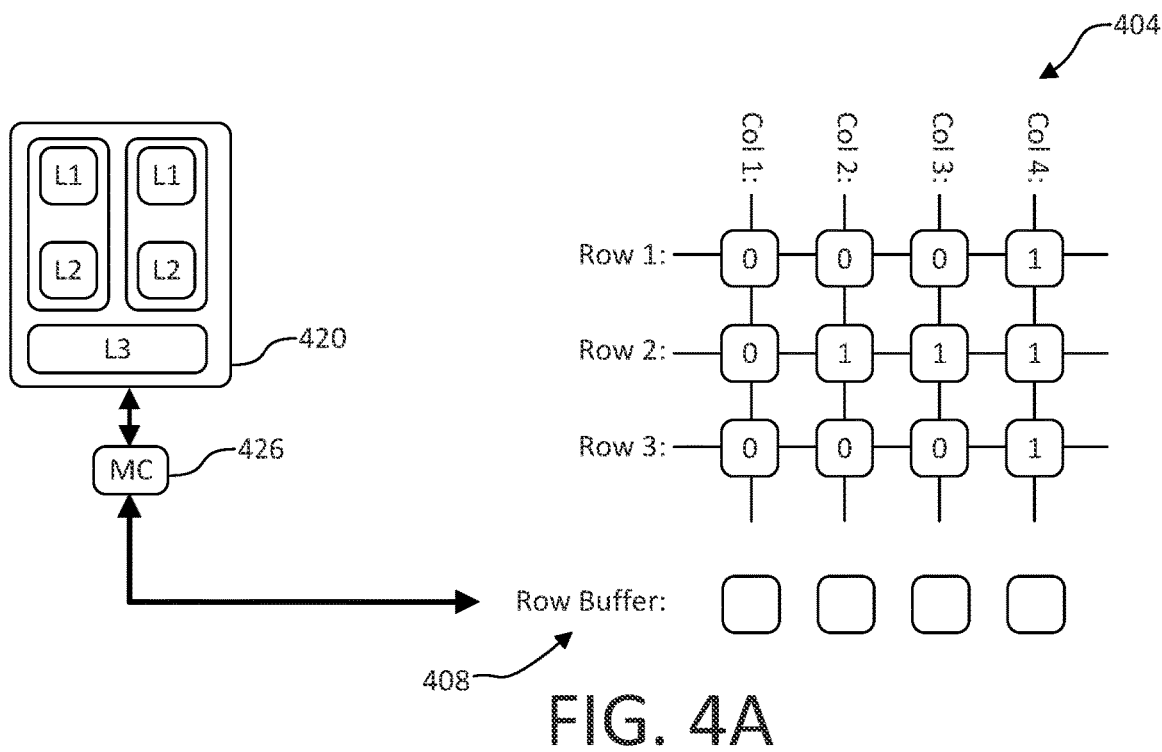
FIGS. 4A-4C depict an example of moving and/or re-mapping data in accordance with examples of the present disclosure.
Figure 4B:
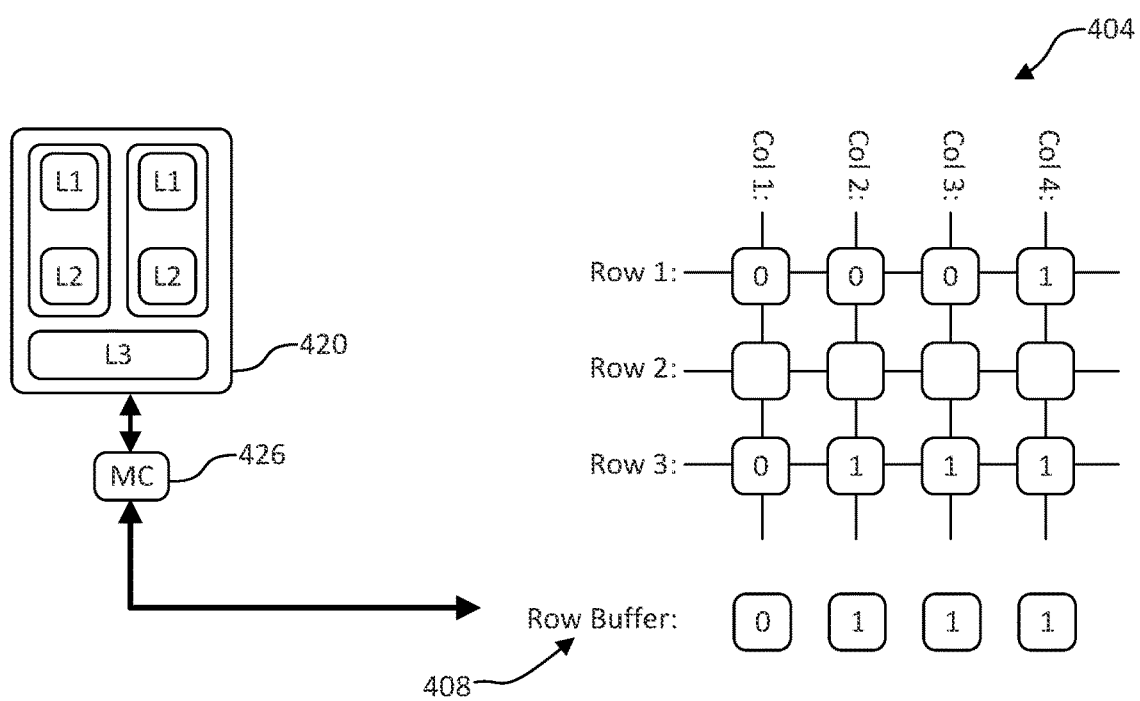
Figure 4C:
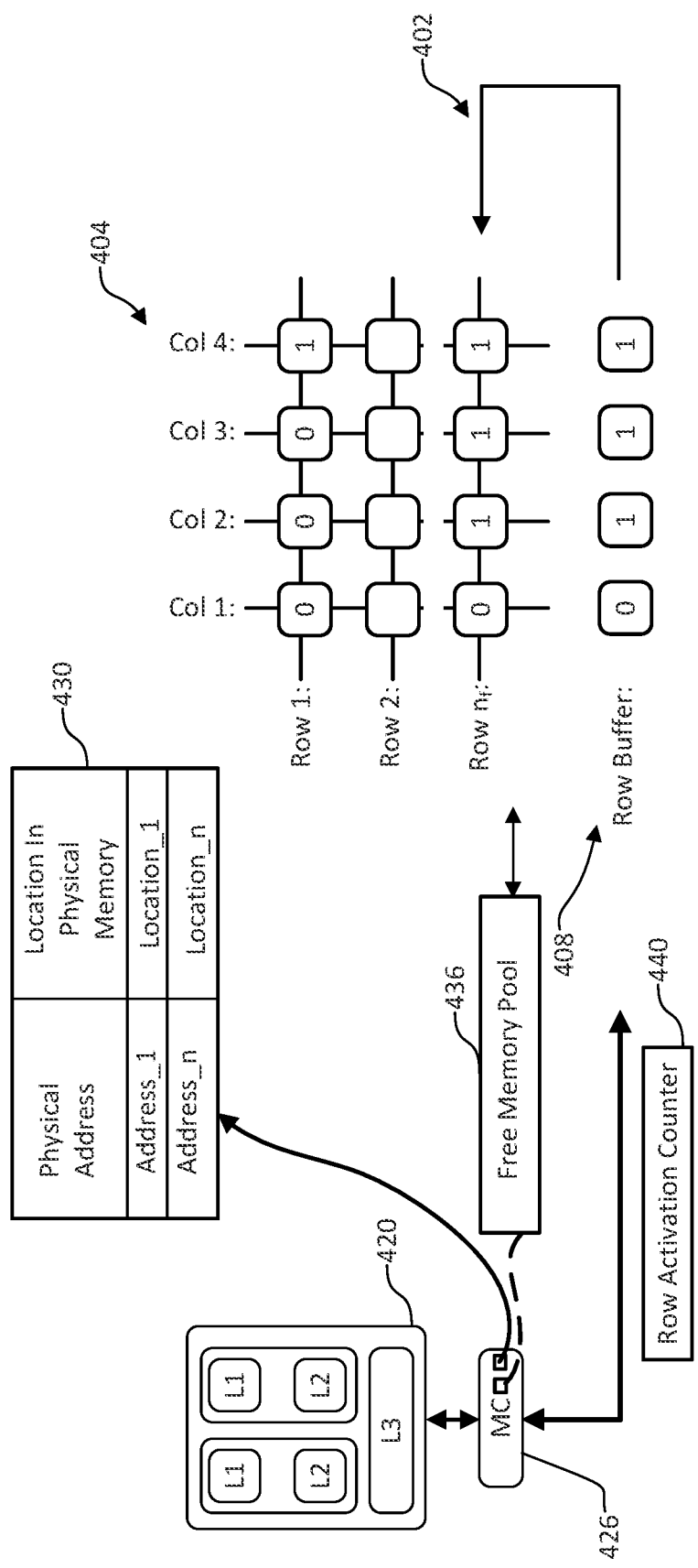

FIGS. 4A-4C depict an example of moving and/or remapping data in accordance with examples of the present disclosure. That is, the CPU 420 may request information associated with a 'physical address' as previously described. The memory controller 426 may translate or otherwise map the 'physical address' to a specific location in the RAM array 404. Accordingly, a local RAM device located on the RAM chip may activate a selected row, such as row 2, causing the contents of row 2 to be written to the row buffer 408. However, in some instances upon reading the selected row, such as row 2, the capacitors in the selected row may become discharged as depicted in FIG. 4B. As depicted in FIG. 4C, if a row is identified as a suspected aggressor row, based on a frequency of activation determined by the row activation counter 440 for example, rather than issuing a write back command by the RAM device causing the contents of the row buffer 408 to be written back to the previous row, such as row 2, the RAM device may perform RowHammer mitigation techniques by accessing a free memory pool table 436 to identify an unused, or free row, such as row no and then writing the data in the row buffer 408 to the identified unused row. In some instances, the previously accessed row, such as row 2, may then be added to the free memory pool. Accordingly, in instances where the potential aggressor row is row 2 and the victim row(s) are row 1 and row 3, the potential aggressor row, once moved, no longer has an effect on the victim row (e.g., row 1 and/or row 3). In some examples, the RAM device may periodically move the contents of a row, or memory location, to another location based on a small aggressor probability p, such that each activation of a row will trigger an aggressor signal with probability p. That is, instead of relying on a row activation counter 440 to identify a row as a potential aggressor row, the activation of the row may trigger a row move based on a probability associated with the row. For example, a random number may be generated or otherwise accessed upon a row activation; if the random number is greater than a probability associated with the row, the row may be identified as a potential aggressor row and may be moved as described herein. That is, the RAM device may move the contents of the potential aggressor row to a new row identified in the free memory pool table 436; in some examples, the previously used row is added to the free memory pool. Of course, when data is moved from one location to another location, the RAM device may remap data associated with the new locations and inform the memory controller 426 as to the location of the moved data, as depicted in the memory map 430.

The free memory pool table 436 may indicate which rows are free and may reside on or off the RAM device. When a RAM device requests a free row, the free memory pool table 436 may determine a free row in a random manner. Accordingly, the row may be randomly assigned such that adversaries are incapable of targeting specific victim rows because an aggressor will be located away from a previously targeted victim row(s). Alternatively, the selection of the free row may not be random, rather it may be pulled from a queue or table in a particular order. One of skill in the art will appreciate that any number of ways of selecting a new row may be employed without departing from the spirit of this disclosure. For example, the movement and remapping of data may occur in accordance with a configuration setting and may only apply when the configuration setting is active and/or may only apply to specific memory locations. In some examples, the free memory pool may be sized as a percentage of or otherwise a portion of an available amount of storage provided by the RAM module 104.

Alternatively, or in addition, the memory controller 426 may be responsible for moving and/or remapping data contained in one or more identified locations. For example, the memory controller may track the available memory in the free memory pool using a free memory pool table 436 containing locations of free or otherwise unused memory in the RAM module 104. The memory controller 426 may then issue a move command to move data from a current location to a free location identified from the free memory pool table 436. The memory controller may then add the previous memory location to the free memory pool table 436 and update a memory map 430 associating the new memory location to the physical address provided by a CPU. In some examples, the movement and remapping of data may occur in accordance with a configuration setting and may only apply when the configuration setting is active and/or may only apply to specific memory locations. In some examples, the free memory pool may be sized as a percentage of or otherwise a portion of an available amount of storage provided by the RAM module 104.

Figure 5:
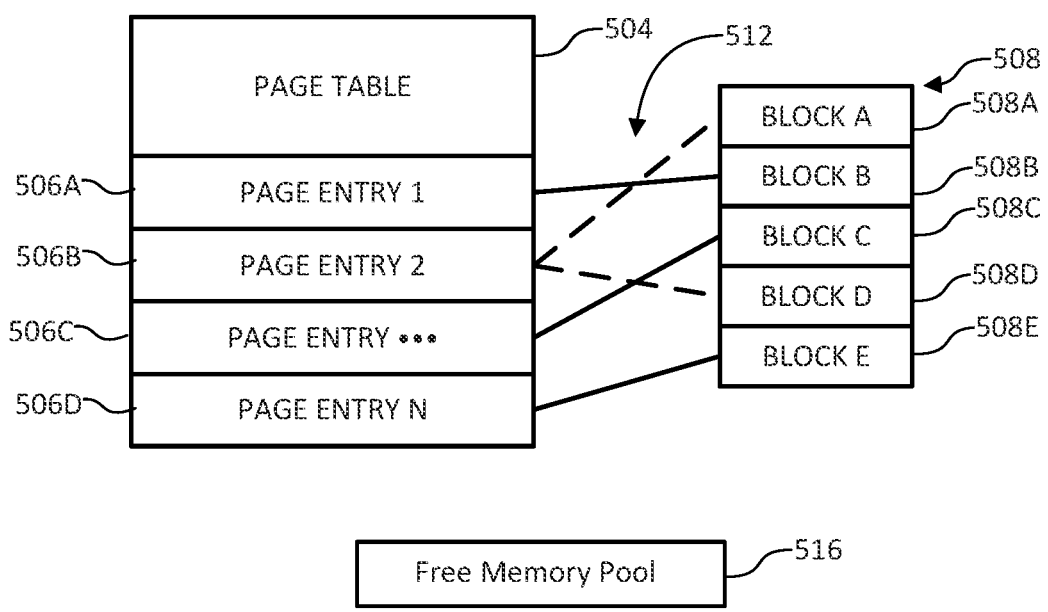
FIG. 5 depicts a page table in accordance with examples of the present disclosure.

In some examples, the identification of a potential aggressor row and/or the movement of data may be performed by an operating system. For example, and in accordance with examples of the present disclosure, a page table 504 as depicted in FIG. 5 may be a data structure used by a virtual memory system in a computer operating system to store the mapping between virtual addresses and physical addresses. In operating systems that use virtual memory, processes are provided with what appears to be a large, contiguous section, or page of memory. Physically, the memory of each process may be dispersed across different areas of physical memory, such as the RAM module 104. When a process requests access to data in its memory, it is the responsibility of the operating system to map the virtual address provided by the process to the physical address such that the memory controller may access the location within the RAM where the data is stored. The page table is where the operating system stores its mappings of virtual addresses to physical addresses, with each mapping also known as a page table entry.

As depicted in FIG. 5, a page table 504 may include one or more page table entries 506A-506D; each page table entry may contain a mapping from a virtual address or page to a physical address or page 508 using one or more of the mappings 512. In accordance with at least one example of the present disclosure, a virtual address stored in page table entry 506B may be translated and mapped to page A 508A. At a random, predetermined time, and/or upon satisfying a particular condition or identifying a memory access as a potential aggressor, the operating system may cause the contents of page A 508A to be moved to page D 508D. Accordingly, the page table entry 506B may then be updated to reflect the updated mapping to page D 508D. As one example, page A 508A may be identified as a potential aggressor page based on a number of activations. In some examples, each page may be associated with a small aggressor probability p, such that upon a read or page access, a generated random number that is greater than a threshold may be used to identify the particular page as a potential aggressor page. In some examples, the probability threshold may be fixed across all pages, or vary per-page. In examples, the identification of the potential aggressor page may be performed by software.

In some examples, the available pages 508 may be identified in a free page pool 516. The free page pool 516 may include pages available to the operating system that are free such that the operating system can move data to one or more pages identified in the free page pool 516. In addition, once a page is no longer mapped to the page table 504, such as page 508A, the no longer used page may be added to the free page pool 516.

Each page entry 506A-D is generally associated with a process, and a decision to remap a page table entry to a different page may be based on a configuration setting as well as an identification that a page may be a potential aggressor page. In instances where an application has been identified as a critical application or a user of the application desires to protect the application against possible issues caused by a RowHammer attack, a configuration setting that allows the operating system to remap a page table entry to a new block may indicate that such a mapping is preferred. Accordingly, at a random or predetermined time, or upon the satisfaction of a specific condition, the operating system may remap the page table entry to the new table. The system may additionally employ various hardware and/or software optimizations to limit the number of remap operations. These optimizations include, but are not limited to, cache line (pseudo-)locking of data within aggressor pages, as well as lazy remapping (i.e., only remapping aggressor pages if subsequently accessed prior to data refresh).

Figure 6:
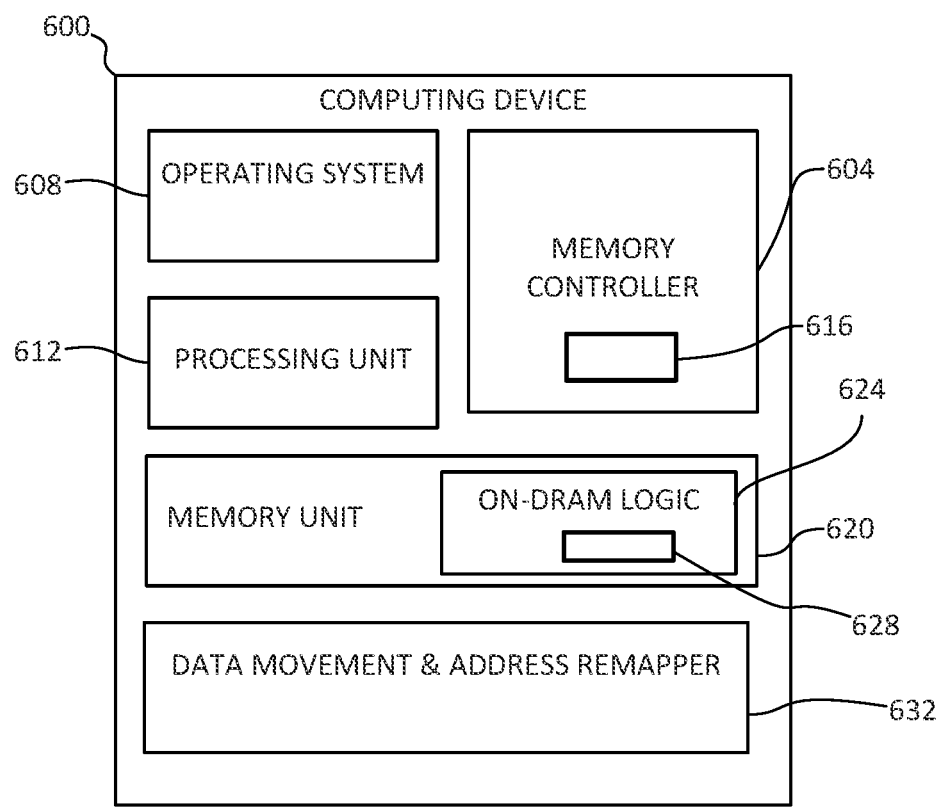
FIG. 6 illustrates an example overview of a computing device for mitigating induced charge leakage due to RowHammer effects in accordance with examples of the present disclosure.

FIG. 6 illustrates an example overview of a computing device 600 for mitigating induced charge leakage due to RowHammer. As depicted in FIG. 6, the computing device 600 is illustrated as comprising a data movement and address remapper 632, a memory controller 604, a processing unit 612, and a RAM unit 620. In examples, the computing device 600 is a desktop computing device, a server computing device, a laptop computing device, or a mobile computing device, among other examples. In some instances, computing device 600 comprises a high-level operating system (e.g., MICROSOFT WINDOWS, LINUX, MAC OS, etc.) and includes the data movement and address remap per 632. For example, one or more system virtual address tables may be used by an operating system (and, in some instances, a hypervisor). A system virtual address may translate to a system physical address, which may in turn translate to a RAM logical address. Ultimately, the logical address may translate to an internal address used by the memory unit. Thus, in some examples, one or more such abstraction layers may be omitted. That is, in some examples, the data movement and address remapper 616/632 may exist in the on-RAM logic 624 and/or the memory controller 604.

Processing unit 612 executes instructions (e.g., the data movement and address remapper 632) and communicates with RAM unit 620 via the memory controller 604. In examples, the memory controller 604 is part of the processing unit 612. As discussed above, the RAM unit 620 comprises cells that store bits. As an example, RAM unit 620 is a dual input memory module (DIMM) comprised of capacitors used to store bits of information. In other examples, the RAM unit 620 is a subpart of a memory module, such as a rank or a bank, among other examples. Memory controller 604 may periodically communicates a refresh command to RAM unit 620, as described above.

The data movement and address remapper 632 may receive a request to move data from one page associated with a page table entry in a page table to a free page identified from a free memory pool in order to mitigate the effects of induced charge leakage according to aspects described herein. For example, an operating system executed by the computing device 600 may establish a page table with one or more page table entries identifying pages of memory in the RAM unit 620 for use by one or more processes. At a random or predetermined time, upon satisfying a specific condition, and/or upon generation and receipt of an aggressor signal, the operating system may cause the contents of a page to be moved to another page identified in a free memory pool. The operating system may then cause the original page to be associated with the free memory pool. For example, to mitigate potential effects of induced charge leakage, one or more pages may be randomly chosen and moved to another page location. Such selection of the pages to be moved may occur according to a schedule or may occur at random times. In some examples, the movement may occur when a location within the page is accessed.

As each page table entry is generally associated with a process, a decision to remap a page table entry to a new page may be based on a configuration setting. For example, in instances where an application has been identified as a critical application or a user of the application desires to protect the application against possible issues caused by a RowHammer attack, a configuration setting that allows the operating system to remap a page table entry to a new page may indicate that such mapping is preferred. Accordingly, at a random or predetermined time, or upon satisfying a specific condition, the operating system may remap the page table entry to the new page.

In some examples, the computing device 600 may include a memory controller 604 that includes the data movement and address remapper 632 to move and/or remap data in order to mitigate the effects of a possible RowHammer attack. For example, the memory controller 604 may be responsible for moving and/or remapping data associated with a potential aggressor region to one or more identified locations. The memory controller may track a free memory pool containing locations of free or otherwise unused locations in the RAM unit 620. The memory controller 604 may then issue a move command to move data from a current location to a free location identified from the free memory pool. The RAM unit 620 may then add the previous location to the free memory pool and update a memory map associating the new RAM location to the physical address provided by the processing unit 612. In some examples, the movement and remapping of data may occur in accordance with a configuration setting and may only apply when the configuration setting is active and/or may only apply to specific memory locations.

In some examples, the RAM unit 620 may include an on-RAM logic 624 that includes the data movement and address remapper 628. As discussed above, the on-RAM logic may cause the data movement and address remapper 628 to access a free memory pool to identify an unused, or free row in which to move data to in order to mitigate and/or eliminate the possible effects of RowHammer. Accordingly, the on-logic RAM may then write the data in the row buffer and transfer the data to the identified unused row of the RAM unit 620. In some instances, the previously accessed row may then be added to the free memory pool. Alternatively, or in addition, the on-RAM logic 624 may periodically move the contents of a row, or location, to another location based on the probabilistic generation of a potential aggressor row indication. For example, each row may be associated with a small aggressor probability p, such that a row may be identified as or otherwise treated as a potential aggressor row if a probability calculation upon row activation is greater than a probability threshold p. The probability may be fixed across all rows, or vary per-row with the use of hardware and/or software state. Accordingly, the on-RAM logic 624 may move the contents of a row to a new row identified in the free memory pool based on such signal. In some examples, the previously used row is added to the free memory pool. Of course, when data is moved from one location to another location, the on-RAM logic 624 may remap data associated with the new locations and inform the memory controller 604 as to the location of the moved data.

Figure 7:
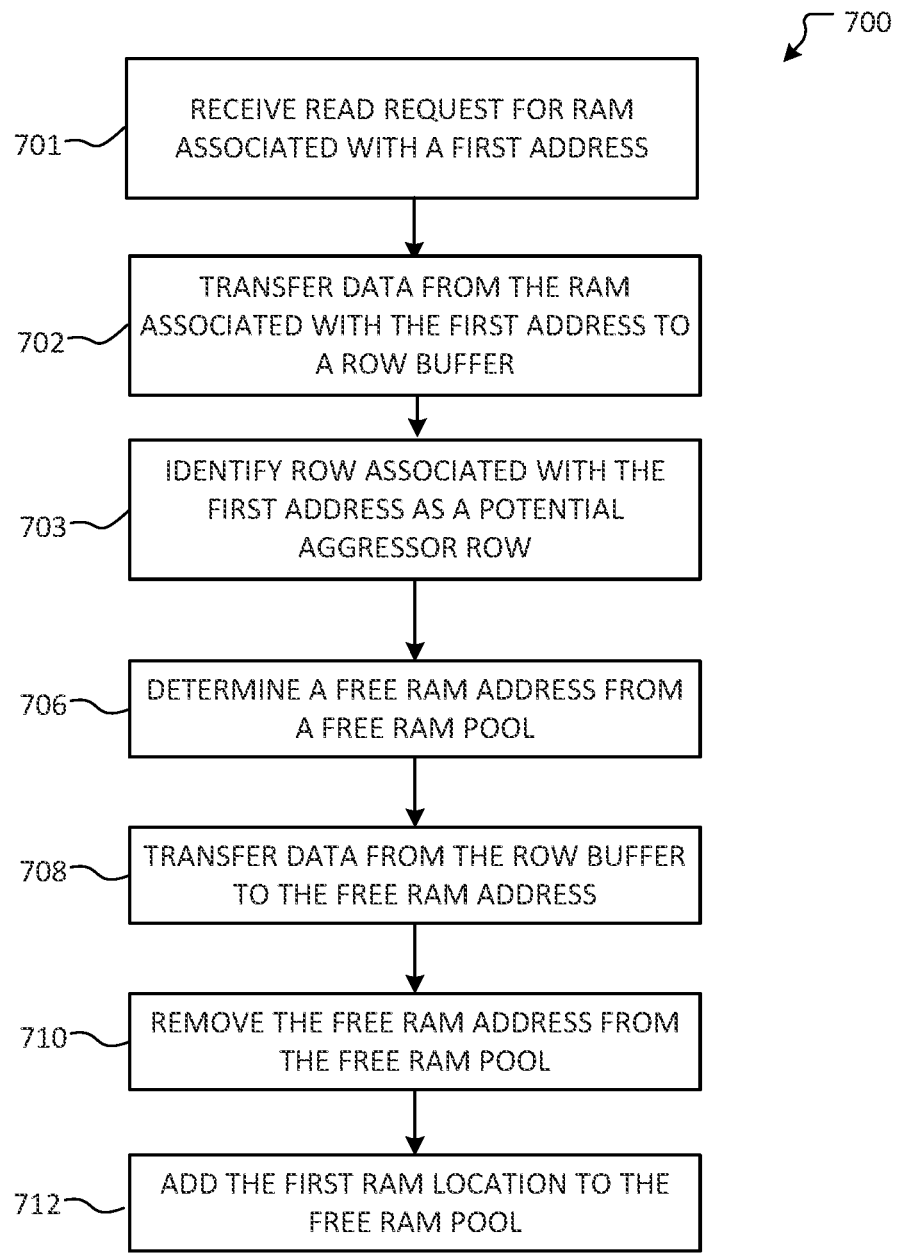
FIG. 7 illustrates an overview of an example method for moving data and re-mapping an address in accordance with examples of the present disclosure.

FIG. 7 illustrates an overview of an example method 700 for moving data and remapping an address in accordance with examples of the present disclosure. In examples, aspects of the method 700 are performed by the RAM device and/or the memory controller, such as the on-RAM logic 624 and/or the memory controller 604. The method 700 begins at operation 701, where a request for data associated with a first address is received. As an example, a read request from the CPU may be received by the memory controller; in some aspects, the read request may originate from the memory controller. In some examples, the read request is for a word; in other examples and where the read request originates from the memory controller, the read request may include a column and/or row. At operation 702, the data from the first address associated with the read request may be transferred to a row buffer.

At operation 703, and based on at least one of the previously mentioned induced charge leakage detection techniques, the read request associated with the first address may be identified as a potential aggressor row. In some examples, a performance counter associated with the first address may indicate that the number of read requests may exceed a threshold, or that a frequency of read requests may exceed a threshold. In some examples, the address, or row, associated with the read request may be identified as a potential aggressor row. In some examples, the row associated with the read request may be identified as a hot row. As previously discussed, the aggressor, the potential aggressor row determination may be generated at each row activation, or read, and may be associated with a probability of activation.

Upon determining that a row is a potential aggressor row or that the row is a hot row, flow may proceed to 706 where the RAM device and/or the memory controller may identify a free RAM address from the free RAM address pool. For example, the RAM device and/or the memory controller may issue a request to the free, or available, RAM pool. The free RAM pool may then randomly select a free RAM address from the pool of free RAM addresses. As another example, the free DRAM pool may generate a random number and return an address associated with the random number. The address may correspond to a location in the RAM array. The method 700 then proceeds to operation 708 where the data residing in the row buffer may be transferred to the identified RAM address received from the free RAM address pool. In some examples, the row buffer may be specific to a particular bank of the RAM. In examples, the free memory pool may be specific to one bank of the RAM or may span multiple banks of the RAM. Accordingly, where a free RAM address is selected that is outside of a RAM bank that is accessible by the row buffer, the row buffer may transfer the data to the memory controller and/or the RAM device such that the memory controller and/or the RAM device can select the correct row buffer associated with the identified free RAM address. The method 700 may then proceed to operation 710 where the identified free RAM address is removed from the free RAM pool. For example, an entry associated with the identified free RAM address may be deleted or otherwise removed. Flow may then proceed to operation 712, where the first RAM address may be added to the free RAM pool. By adding the first RAM address to the free RAM pool, the RAM pool may maintain ample RAM addresses for purposes described herein.

In some examples, operations 706-712 may operate based on a configuration setting indicating that the first address and/or a process associated with the first address is to be protected from RowHammer attacks and/or induced charge leakage that potentially causes corrupt data in the first address. Such a configuration setting may be associated with an identifier indicating whether such addresses should be moved and remapped.

While the operations of method 700 are described above in a certain order, it will be appreciated that any of a variety of other orders may be utilized. For example, the free RAM address identified from the free RAM address pool may be identified before the transfer of data from the first address to the row buffer. As another example, the identified free RAM address may be removed from the free RAM address pool before the data in the row buffer is written to identified free RAM address.

In accordance with some examples of the present disclosure, the identification that the first row is a potential aggressor row may be based on a variety of conditions or a probability model. For example, a potential aggressor row may be identified upon a cache miss and/or when the CPU requests data from a RAM array. In some examples, the identification of the potential aggressor row may be performed when a performance counter reaches a specific value, such as when a number or row activates exceeds a threshold or threshold frequency. In some examples, the identification of a potential aggressor row may be dependent upon a random probability associated with each row such that within a period of time, at least a threshold number of rows are moved, or that upon a certain number of activations, a row will be probabilistically identified as a potential aggressor row and then moved. By randomly moving rows of data, the ability of an aggressor row(s) to target a specific victim row is substantially reduced, as is the risk of inductive charge leakage that may occur during legitimate use.

Figure 8:
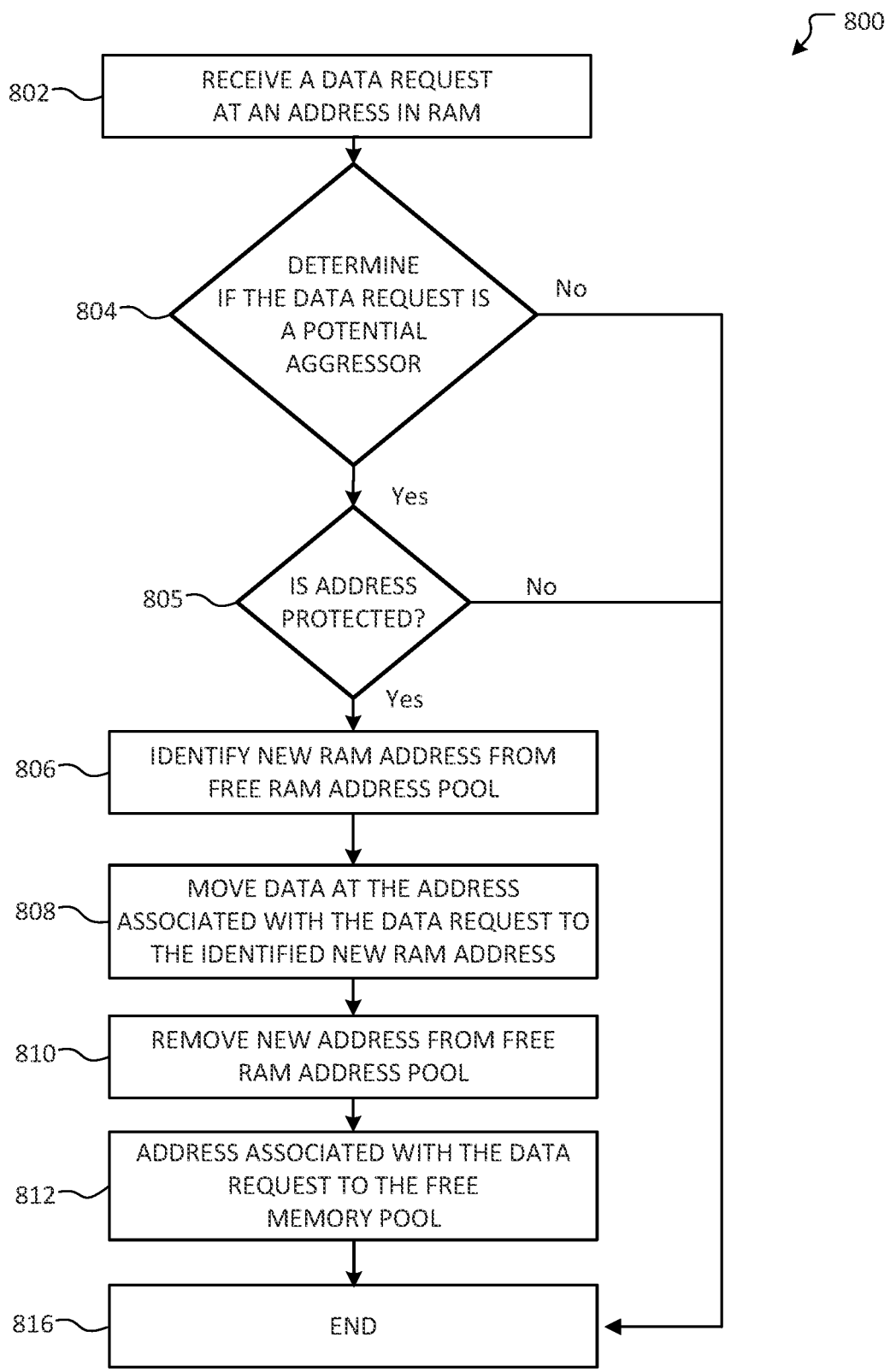
FIG. 8 illustrates an overview of an example method for moving data and re-mapping an address in accordance with examples of the present disclosure.

FIG. 8 illustrates an overview of an example method 800 for moving data and remapping an address in accordance with examples of the present disclosure. In examples, aspects of the method 800 are performed by the memory controller, such as the memory controller 604. The method 800 begins at operation 802, where a data request is received at an address in RAM. At 804, a determination may be made as to whether an address, and therefore a row, associated with the data request is a potential aggressor row. As previously discussed, the potential aggressor row may be based on a frequency of activation and/or a probability associated with DRAM access. In examples where the data request is not determined to be a potential aggressor, the method 800 may end at 816. The method 800 may then proceed to 805, where a determination is made as to whether the identified address is identified as an address that is protected against RowHammer attacks and/or induced charge leakage. For example, a configuration setting may indicate that the address is to be protected. As another example, a configuration setting associated with a process may indicate that all addresses associated with the process are to be protected from RowHammer and induced charge leakage. In examples where the configuration setting indicates that the identified address is not to be protected from RowHammer attacks, the method 800 may end at 816.

The method 800 may proceed to 806 where a RAM address from a free RAM address pool may be identified. For example, the memory controller may issue a request to the free RAM address pool. The free RAM address pool may then randomly select a free RAM address from the pool of free RAM addresses. As another example, the free RAM address pool may generate a random number and return an address associated with the random number. The address location may correspond to a location in the RAM array. The method 800 then proceeds to operation 808 where the data stored in the address identified as a potential aggressor row is moved to the identified free RAM address. For example, the memory controller may issue a move command to move the data from the address identified as a potential aggressor row to the identified free RAM address. Method 800 may then proceed to operation 810 where the identified free RAM address is removed from the free RAM address pool. Flow may proceed to operation 812, where the address identified as the possible aggressor is added to the free RAM address pool. By adding this address to the free RAM address pool, the RAM address pool may maintain ample memory locations for purposes described herein.

While the operations of method 800 is described above in a certain order, it will be appreciated that any of a variety of other orders may be utilized. For example, the free RAM addresses identified from the free RAM address pool may be identified before the address is identified as a potential aggressor. As another example, the identified free RAM address may be removed from the free RAM address pool before the data is moved from the aggressor address to the identified free RAM address. Method 800 may end at 816.

Figure 9:
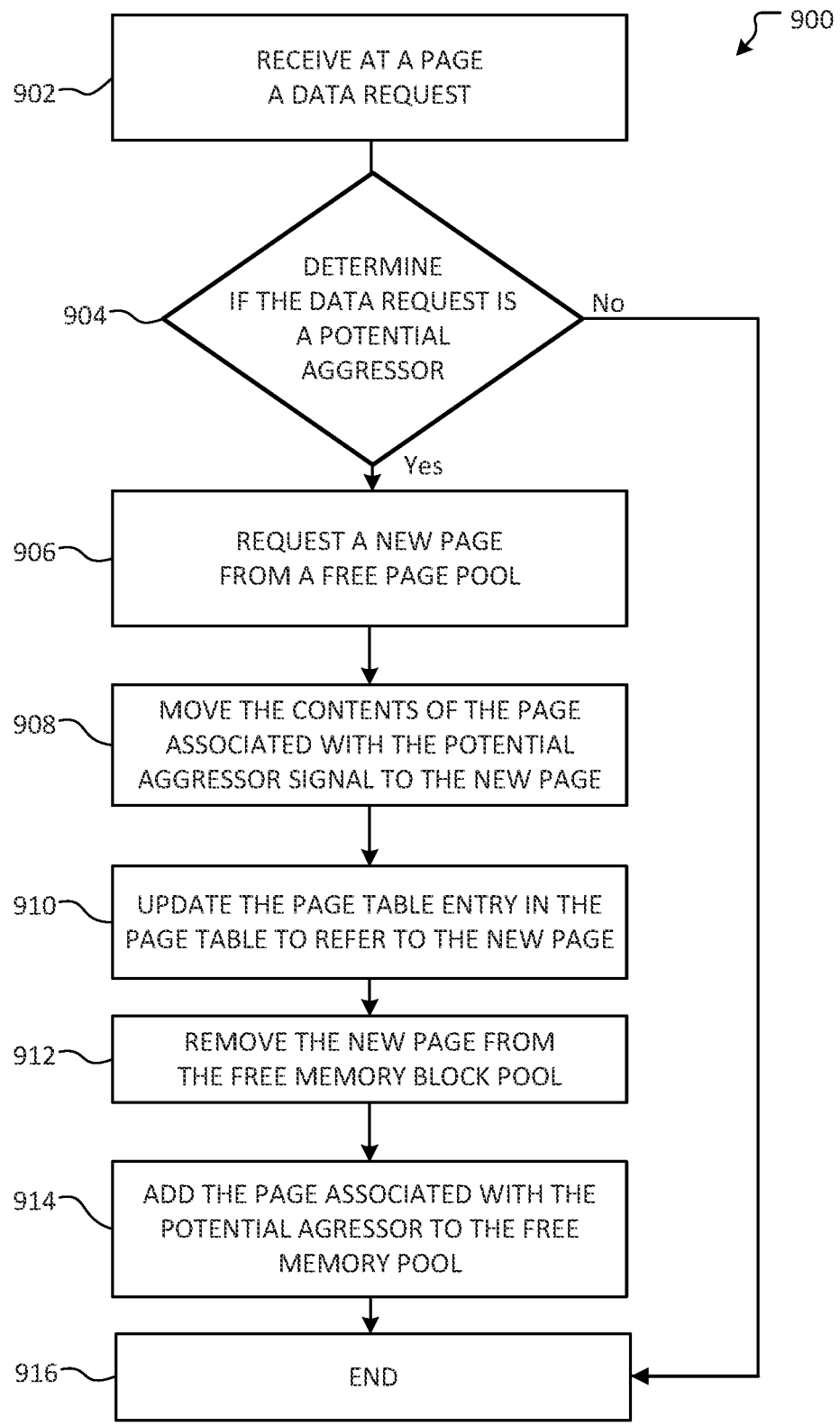
FIG. 9 illustrates an overview of an example method for moving data and re-mapping a block of memory associated with a page in a page table in accordance with examples of the present disclosure.

FIG. 9 illustrates an overview of an example method 900 for moving data and remapping a block of memory associated with a page in a page table in accordance with examples of the present disclosure. In examples, aspects of the method 900 are performed by the processing unit 612 and the operating system 608. In examples, the memory controller 604 and on-RAM logic 624 may be invoked as necessary to move data from one memory location to another. More specifically, the method 900 may begin at operation 902, where a read request associated with a page is received. Flow may proceed to 904, where a determination may be made as to whether the read request is associated with a potential aggressor page. In examples, a potential aggressor may be identified based on a number of memory reads associated with a page. In some examples, each page may be associated with a small aggressor probability p, such that each page access, or a memory read associated with the page. In some examples, if a random number is generated that exceeds the probability threshold p, the page may be considered to be an aggressor page and may be moved as described herein. The probability may be fixed across all pages, or vary per-page. In examples, the determination as to whether or not the page is associated with a potential aggressor may be performed in software.

In examples, the page table entry in the page table may correspond to a virtual address. In some instances, the virtual address may be associated with a process and/or application. The method 900 may then proceed to determine whether the page table entry in the page table associated with the aggressor signal is identified as an address that is protected against RowHammer attacks and/or induced charge leakage. For example, a configuration setting may indicate that the address or page is to be protected. As another example, a configuration setting associated with a process may indicate that all address associated with a page table entry in the page table should be protected from RowHammer and induced charge leakage. In examples where the data request is not associated with a potential aggressor, the method 900 may end at 916.

The method 900 may proceed to 906 where a new page is requested from a free page pool. For example, the operating system may issue a request to the free page pool. The free page pool may then randomly select a free page. As another example, the free page pool may generate a random number and return a free page associated with the random number. The method 900 then proceeds to operation 908 where the contents of the page associated with the aggressor signal is moved or otherwise stored in the new page. For example, the operating system may cause the memory controller to move the contents of one page to another page. Method 900 may then proceed to operation 910 where the page table entry is updated to refer to the new page. Flow may proceed to operation 912, where the new page is removed from the free page pool. At operation 914, the page associated with the aggressor signal may be added to the free page pool. By adding this page to the free page pool, the free page block pool may maintain ample available pages for purposes described herein.

While the operations of method 900 is described above in a certain order, it will be appreciated that any of a variety of other orders may be utilized. For example, the new page may be identified from the free page pool before the page table entry in the page table associated with the aggressor page is identified. As another example, the new page may be removed from the free page pool before the data is moved from the initial page to the new page.

In accordance with some examples of the present disclosure, a page may be identified as a potential aggressor page based upon a CPU event, such as but not limited to a cache miss, a page access, or a performance counter associated with memory or data access within a page reaching a particular value. In some examples, the operating system may determine that a page may be identified as a potential aggressor page when the operating system reads the contents of a cache line for example, when the operating system copies a page, or when the operating system copies another unit of data to a new location. In some examples, the determination as to whether the apge is a potential aggressor page may be generated in a probabilistic manner and may be generated when a probability associated with one or more of the above events is greater than or equal to a threshold. As can be appreciated, the method 900 may be entirely performed in software. Accordingly, other than storing and retrieving data, the need to interact with hardware to prevent RowHammer attacks and/or induced charge leakage can be avoided.

Figures 10A, 10B:
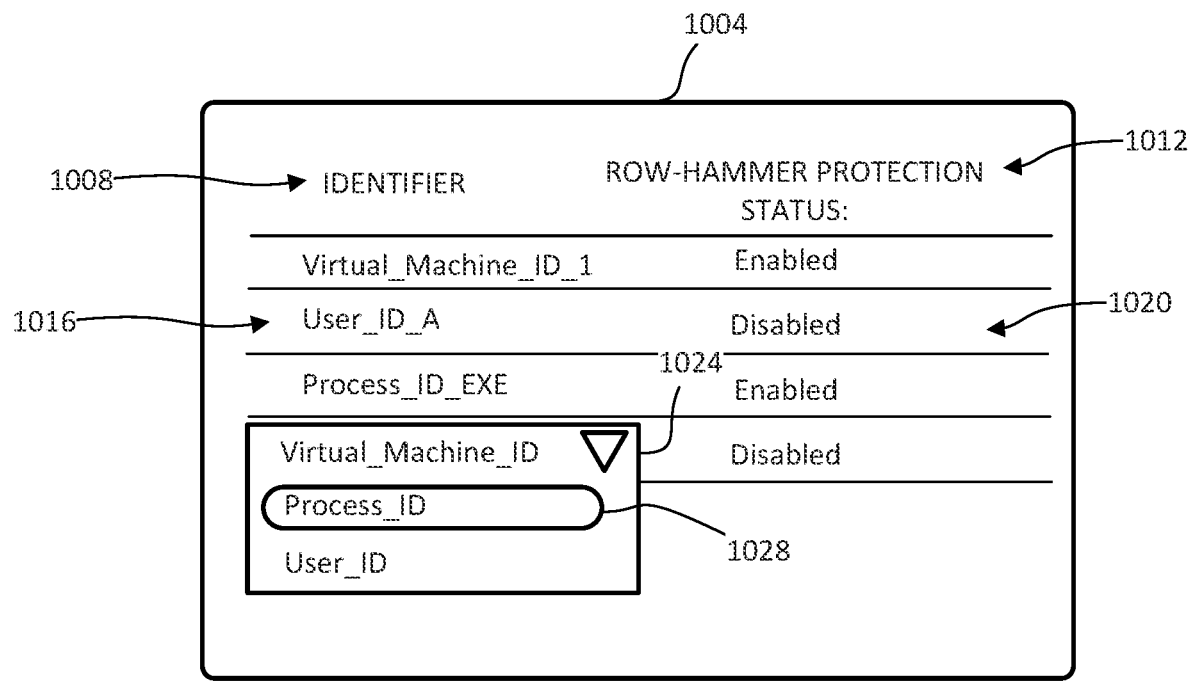
FIG. 10A depicts an example user interface for configuring RowHammer protection as a service to monitor at least one of a virtual machine, user, or process in accordance with examples of the present disclosure.
FIG. 10B depicts a data structure for indicating that an identifier is associated with a protected memory space in accordance with examples of the present disclosure.

FIG. 10A describes an example user interface 1004 for configuring RowHammer protection as a service to monitor at least one of a virtual machine, user, a storage drive, a thread, a process, or a sub-process in accordance with examples of the present disclosure. While a virtual machine identifier, user identifier, and process identifier are depicted in FIG. 10A, RowHammer protection may be applied to other or additional portions of a computing system. For example, the granularity of RowHammer protection may be defined in accordance with one or more attributes used to identify or specific an area of the RAM unit. Such attributes may correspond to an execution context identifier, such as but not limited to a machine identifier, a user identifier, or a process identifier. As another example, in a multi-tenant setting, a tenant identifier may be utilized to protect one portion of the RAM unit and not another portion.

As further depicted in the user interface of 1004, an identifier column 1008 and a RowHammer protection status column 1012 may be displayed to a user. For the identifier column 1008, a user may configure the particular identifier associated with RowHammer protection. For example, a dropdown list 1024 may allow a user to configure RowHammer protection by Process_ID 1028 and then specify a process, such as Process_ID_EXE for protection. Of course, other identifiers and/or configurations are possible. For example, storage drive, a thread identifier, and/or a subprocess identifier may further be configured for RowHammer and/or other charge induced leakage prevention. In addition, and as previously mentioned, a status of the RowHammer protection may be displayed to the user in the RowHammer protection status column 1012. For example, the RowHammer protection status may be displayed as enabled or disabled. In some examples, a user may interact with the RowHammer protection status column 1012 to selectively enable or disable RowHammer protection.

In some examples, the user interface 1004 may provide a notification to a user that a memory address or computer system may benefit from RowHammer mitigation as described herein. For example, a popup may be provided to the user and/or an event in an event log may indicate that a potential RowHammer attack and/or other charge induced leakage event may occur.

FIG. 10B depicts a data structure 1032 for indicating that an identifier 1036 is associated with a protected memory space or portion of a RAM array in accordance with examples of the present disclosure. For example, the identifier 1036 may indicate that an address space, a user, a process, virtual machine identifier, or an application may be associated with a protected memory space or protection portion of the RAM array. For example, a protected portion may be a portion of the RAM array that is protected against row-hammer attacks and/or inducted charge leakage as described herein. The identifier 1036 may be an execution context identifier such as an identifier associated with or otherwise corresponding to a user identifier; accordingly, all memory, such as RAM, accessed or used by the user associated with the user identifier may be protected from row-hammer protection and/or induced charge leakage. The protected memory space identifier 1040 indicates whether the identifier 1036 is associated with a protected memory space, where a protected memory space. Accordingly, different portions of memory, or different portions of a RAM array, different users, and/or different processes may be configured with a protected memory space and thereby be protected from RowHammer attacks as described herein.

Figure 11:
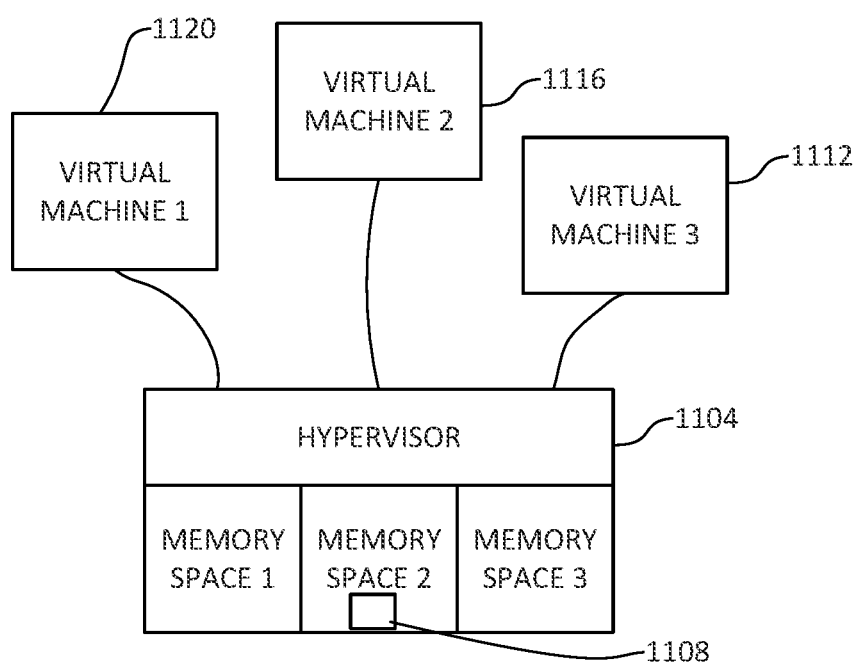
FIG. 11 depicts a block diagram of a multi-tenant configuration in accordance with at least one example of the present disclosure.

FIG. 11 depicts a block diagram of a multi-tenant configuration in accordance with at least one example of the present disclosure. For example, a hypervisor 1104 may have access to memory space 1, memory space 2, and memory space 3. One or more virtual machines, such as virtual machine 1 1120, virtual machine 2 1116, and virtual machine 3 1112 may be provided by the hypervisor 1104. In some examples, a portion 1108 of the memory space may be shared by each of the virtual machine 1 1120, virtual machine 2 1116, and/or virtual machine 3 1112. To prevent a possible RowHammer attack and/or data corruption caused by induced charge leakage, the portion 1108 of the memory space may be protected in accordance with the memory protection methods described herein. Accordingly, a bad actor, such as virtual machine 1 1120 cannot corrupt the data in the portion 1108 of the memory space.

FIGS. 12-15 and the associated descriptions provide a discussion of a variety of operating environments in which aspects of the disclosure may be practiced. However, the devices and systems illustrated and discussed with respect to FIGS. 12-15 are for purposes of example and illustration and are not limiting of a vast number of computing device configurations that may be utilized for practicing aspects of the disclosure, described herein.

Figure 12:
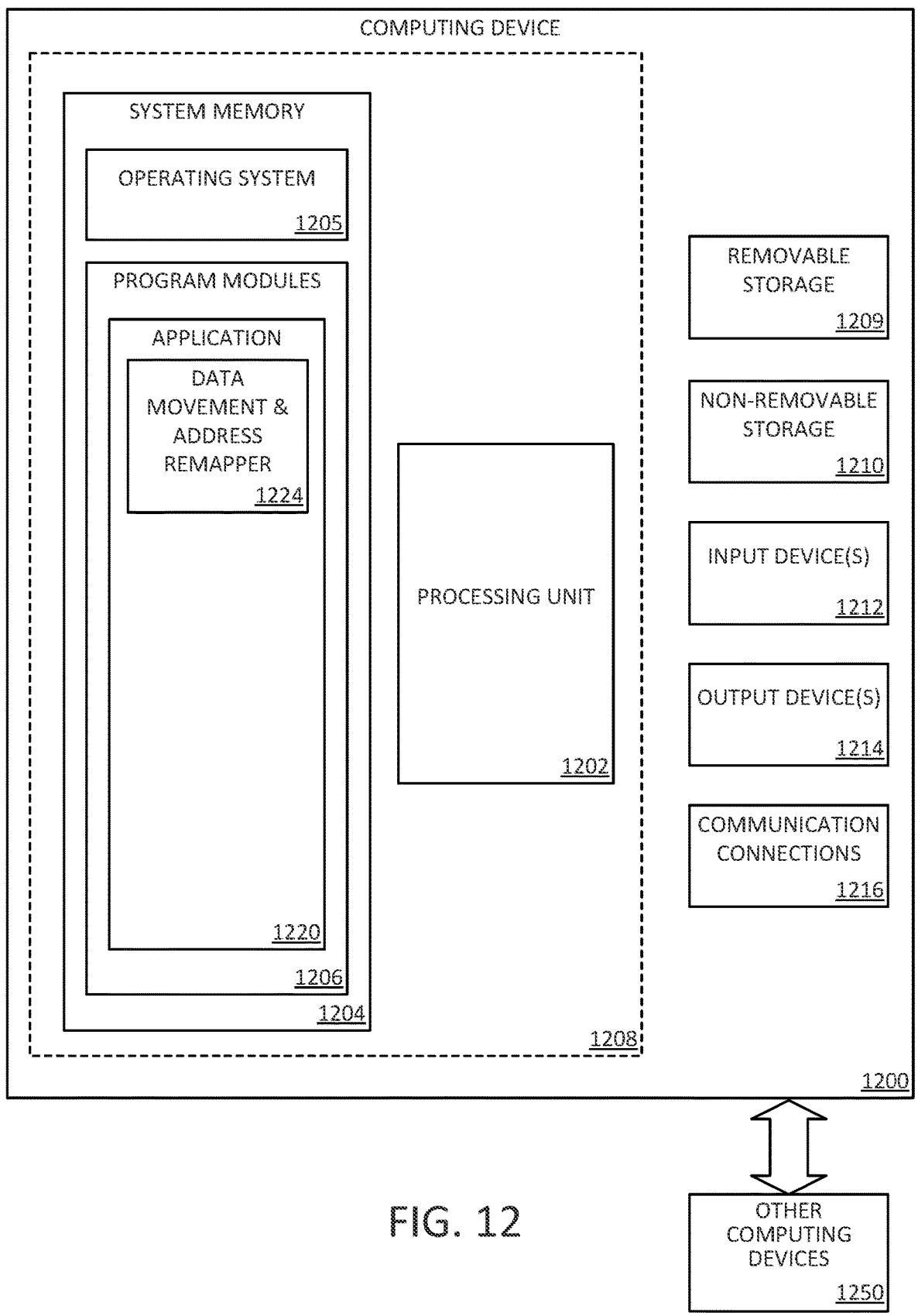
FIG. 12 is a block diagram illustrating physical components (e.g., hardware) of a computing device with which aspects of the disclosure may be practiced.

FIG. 12 is a block diagram illustrating physical components (e.g., hardware) of a computing device 1200 with which aspects of the disclosure may be practiced. The computing device components described below may be suitable for the computing devices described above, including the computing devices 600 in FIG. 6. In a basic configuration, the computing device 1200 may include at least one processing unit 1202 and a system memory 1204, where the system memory 1204 may be DRAM. Depending on the configuration and type of computing device, the system memory 1204 may comprise, but is not limited to, volatile storage (e.g., random-access memory (RAM)), non-volatile storage (e.g., read-only memory (ROM)), flash memory, or any combination of such memories.

The system memory 1204 may include an operating system 1205 and one or more program modules 1206 suitable for running software application 1220, such as one or more components supported by the systems described herein. As examples, system memory 1204 may store the data movement and address mapper 1224. The operating system 1205, for example, may be suitable for controlling the operation of the computing device 1200.

Furthermore, embodiments of the disclosure may be practiced in conjunction with a graphics library, other operating systems, or any other application program and is not limited to any particular application or system. This basic configuration is illustrated in FIG. 12 by those components within a dashed line 1208. The computing device 1200 may have additional features or functionality. For example, the computing device 1200 may also include additional data storage devices (removable and/or non-removable) such as, for example, magnetic disks, optical disks, or tape. Such additional storage is illustrated in FIG. 12 by a removable storage device 1209 and a non-removable storage device 1210.

As stated above, a number of program modules and data files may be stored in the system memory 1204. While executing on the processing unit 1202, the program modules 1206 (e.g., application 1220) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 12 may be integrated onto a single integrated circuit. Such an SOC device may include one or more processing units, graphics units, communications units, system virtualization units and various application functionality, all of which are integrated (or "burned") onto the chip substrate as a single integrated circuit. When operating via an SOC, the functionality, described herein, with respect to the capability of client to switch protocols may be operated via application-specific logic integrated with other components of the computing device 1200 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

The computing device 1200 may also have one or more input device(s) 1212 such as a keyboard, a mouse, a pen, a sound or voice input device, a touch or swipe input device, etc. The output device(s) 1214 such as a display, speakers, a printer, etc. may also be included. The aforementioned devices are examples and others may be used. The computing device 1200 may include one or more communication connections 1216 allowing communications with other computing devices 1250. Examples of suitable communication connections 1216 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable, and non-removable media implemented in any method or technology for storage of information, such as computer readable instructions, data structures, or program modules. The system memory 1204, the removable storage device 1209, and the non-removable storage device 1210 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1200. Any such computer storage media may be part of the computing device 1200. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 13A:
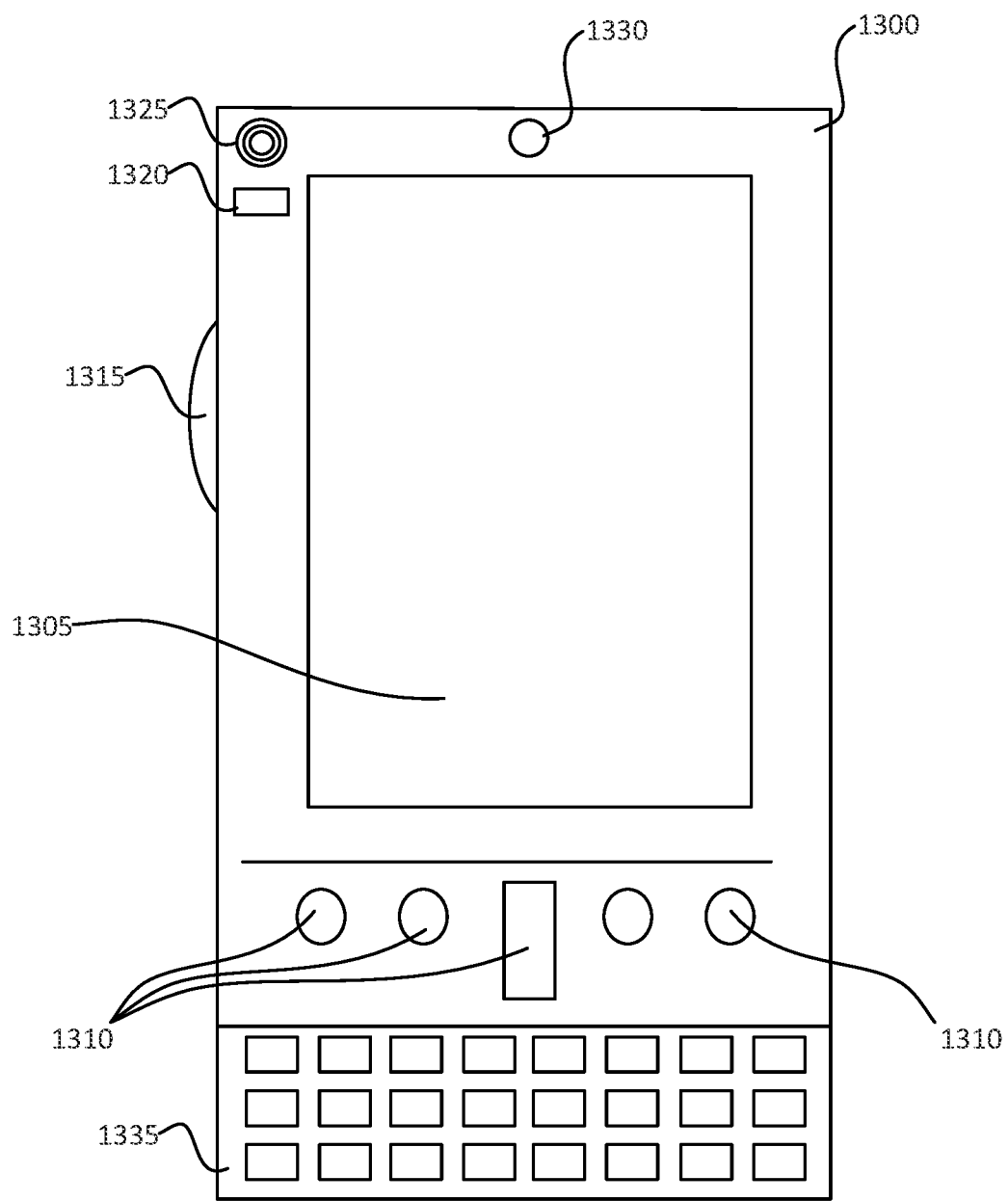
FIGS. 13A-13B illustrate a mobile computing device with which embodiments of the disclosure may be practiced.
Figure 13B:
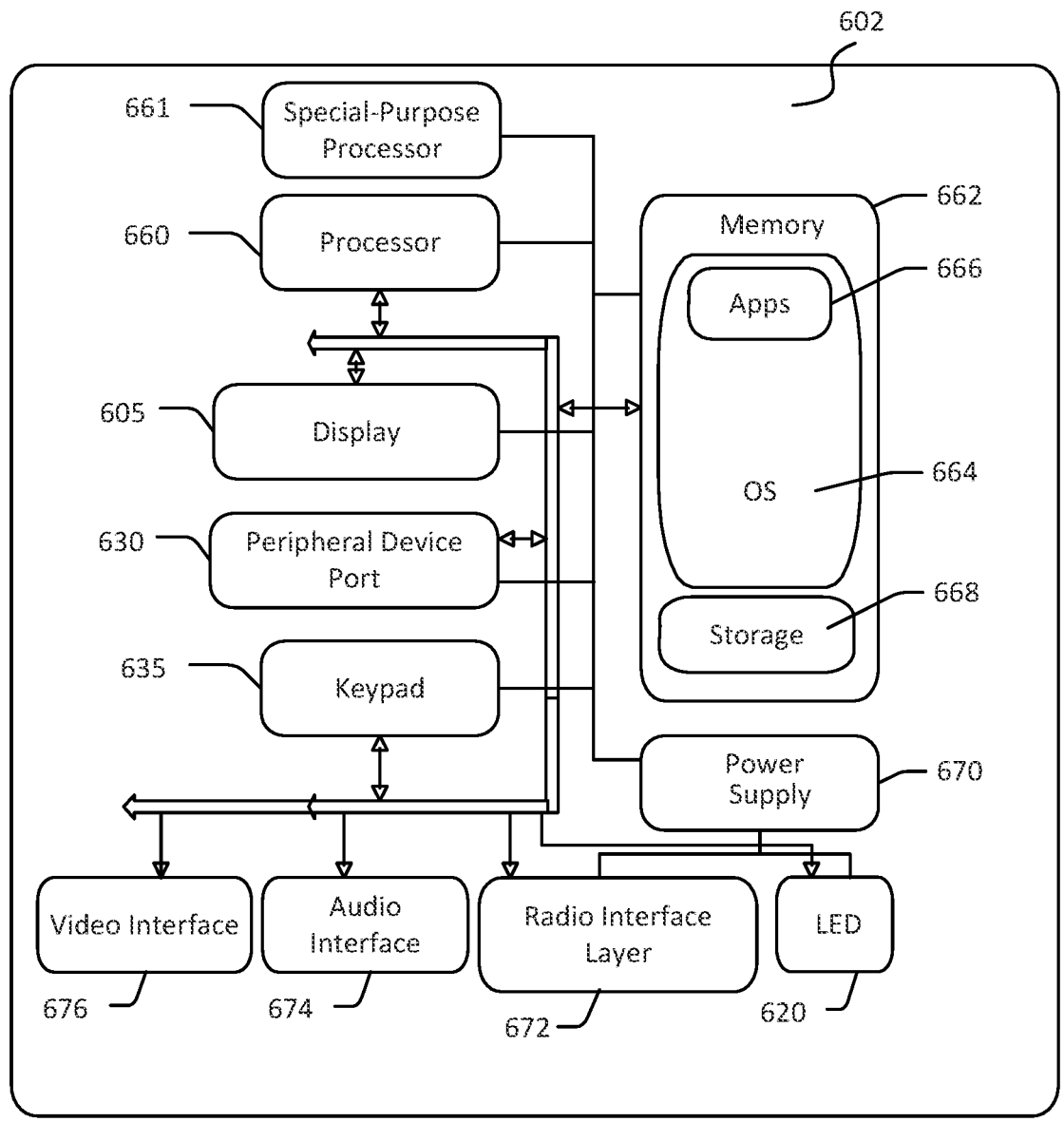

FIGS. 13A-13B illustrate a mobile computing device 1300, for example, a mobile telephone, a smart phone, wearable computer (such as a smart watch), a tablet computer, a laptop computer, and the like, with which embodiments of the disclosure may be practiced. In some respects, the client may be a mobile computing device. With reference to FIG. 13A, one aspect of a mobile computing device 1300 for implementing the aspects is illustrated. In a basic configuration, the mobile computing device 1300 is a handheld computer having both input elements and output elements. The mobile computing device 1300 typically includes a display 1305 and one or more input buttons 1310 that allow the user to enter information into the mobile computing device 1300. The display 1305 of the mobile computing device 1300 may also function as an input device (e.g., a touch screen display).

If included, an optional side input element 1315 allows further user input. The side input element 1315 may be a rotary switch, a button, or any other type of manual input element. In alternative aspects, mobile computing device 1300 may incorporate greater or fewer input elements. For example, the display 1305 may not be a touch screen in some embodiments.

In yet another alternative embodiment, the mobile computing device 1300 is a portable phone system, such as a cellular phone. The mobile computing device 1300 may also include an optional keypad 1335. Optional keypad 1335 may be a physical keypad or a "soft" keypad generated on the touch screen display.

In various embodiments, the output elements include the display 1305 for showing a graphical user interface (GUI), a visual indicator 1320 (e.g., a light emitting diode), and/or an audio transducer 1325 (e.g., a speaker). In some aspects, the mobile computing device 1300 incorporates a vibration transducer for providing the user with tactile feedback. In yet another aspect, the mobile computing device 1300 incorporates input and/or output ports, such as an audio input (e.g., a microphone jack), an audio output (e.g., a headphone jack), and a video output (e.g., a HDMI port) for sending signals to or receiving signals from an external device.

FIG. 13B is a block diagram illustrating the architecture of one aspect of a mobile computing device. That is, the mobile computing device 1300 can incorporate a system (e.g., an architecture) 1302 to implement some aspects. In one embodiment, the system 1302 is implemented as a "smart phone" capable of running one or more applications (e.g., browser, e-mail, calendaring, contact managers, messaging clients, games, and media clients/players). In some aspects, the system 1302 is integrated as a computing device, such as an integrated personal digital assistant (PDA) and wireless phone.

One or more application programs 1366 may be loaded into the memory 1362 and run on or in association with the operating system 1364. Examples of the application programs include phone dialer programs, e-mail programs, personal information management (PIM) programs, word processing programs, spreadsheet programs, Internet browser programs, messaging programs, and so forth. The system 1302 also includes a non-volatile storage area 1368 within the memory 1362. The non-volatile storage area 1368 may be used to store persistent information that should not be lost if the system 1302 is powered down. The application programs 1366 may use and store information in the non-volatile storage area 1368, such as e-mail or other messages used by an e-mail application, and the like. A synchronization application (not shown) also resides on the system 1302 and is programmed to interact with a corresponding synchronization application resident on a host computer to keep the information stored in the non-volatile storage area 1368 synchronized with corresponding information stored at the host computer. As should be appreciated, other applications may be loaded into the memory 1362 and run on the mobile computing device 1300 described herein (e.g., search engine, extractor module, relevancy ranking module, answer scoring module, etc.).

The system 1302 has a power supply 1370, which may be implemented as one or more batteries. The power supply 1370 might further include an external power source, such as an AC adapter or a powered docking cradle that supplements or recharges the batteries.

The system 1302 may also include a radio interface layer 1372 that performs the function of transmitting and receiving radio frequency communications. The radio interface layer 1372 facilitates wireless connectivity between the system 1302 and the "outside world," via a communications carrier or service provider. Transmissions to and from the radio interface layer 1372 are conducted under control of the operating system 1364. In other words, communications received by the radio interface layer 1372 may be disseminated to the application programs 1366 via the operating system 1364, and vice versa.

The visual indicator 1320 may be used to provide visual notifications, and/or an audio interface 1374 may be used for producing audible notifications via the audio transducer 1325. In the illustrated embodiment, the visual indicator 1320 is a light emitting diode (LED) and the audio transducer 1325 is a speaker. These devices may be directly coupled to the power supply 1370 so that when activated, they remain on for a duration dictated by the notification mechanism even though the processor 1360 and other components might shut down for conserving battery power. The LED may be programmed to remain on indefinitely until the user takes action to indicate the powered-on status of the device. The audio interface 1374 is used to provide audible signals to and receive audible signals from the user. For example, in addition to being coupled to the audio transducer 1325, the audio interface 1374 may also be coupled to a microphone to receive audible input, such as to facilitate a telephone conversation. In accordance with embodiments of the present disclosure, the microphone may also serve as an audio sensor to facilitate control of notifications, as will be described below. The system 1302 may further include a video interface 1376 that enables an operation of an on-board camera 1330 to record still images, video stream, and the like.

A mobile computing device 1300 implementing the system 1302 may have additional features or functionality. For example, the mobile computing device 1300 may also include additional data storage devices (removable and/or non-removable) such as, magnetic disks, optical disks, or tape. Such additional storage is illustrated in FIG. 13B by the non-volatile storage area 1368.

Data/information generated or captured by the mobile computing device 1300 and stored via the system 1302 may be stored locally on the mobile computing device 1300, as described above, or the data may be stored on any number of storage media that may be accessed by the device via the radio interface layer 1372 or via a wired connection between the mobile computing device 1300 and a separate computing device associated with the mobile computing device 1300, for example, a server computer in a distributed computing network, such as the Internet. As should be appreciated such data/information may be accessed via the mobile computing device 1300 via the radio interface layer 1372 or via a distributed computing network. Similarly, such data/information may be readily transferred between computing devices for storage and use according to well-known data/information transfer and storage means, including electronic mail and collaborative data/information sharing systems.

Figure 14:
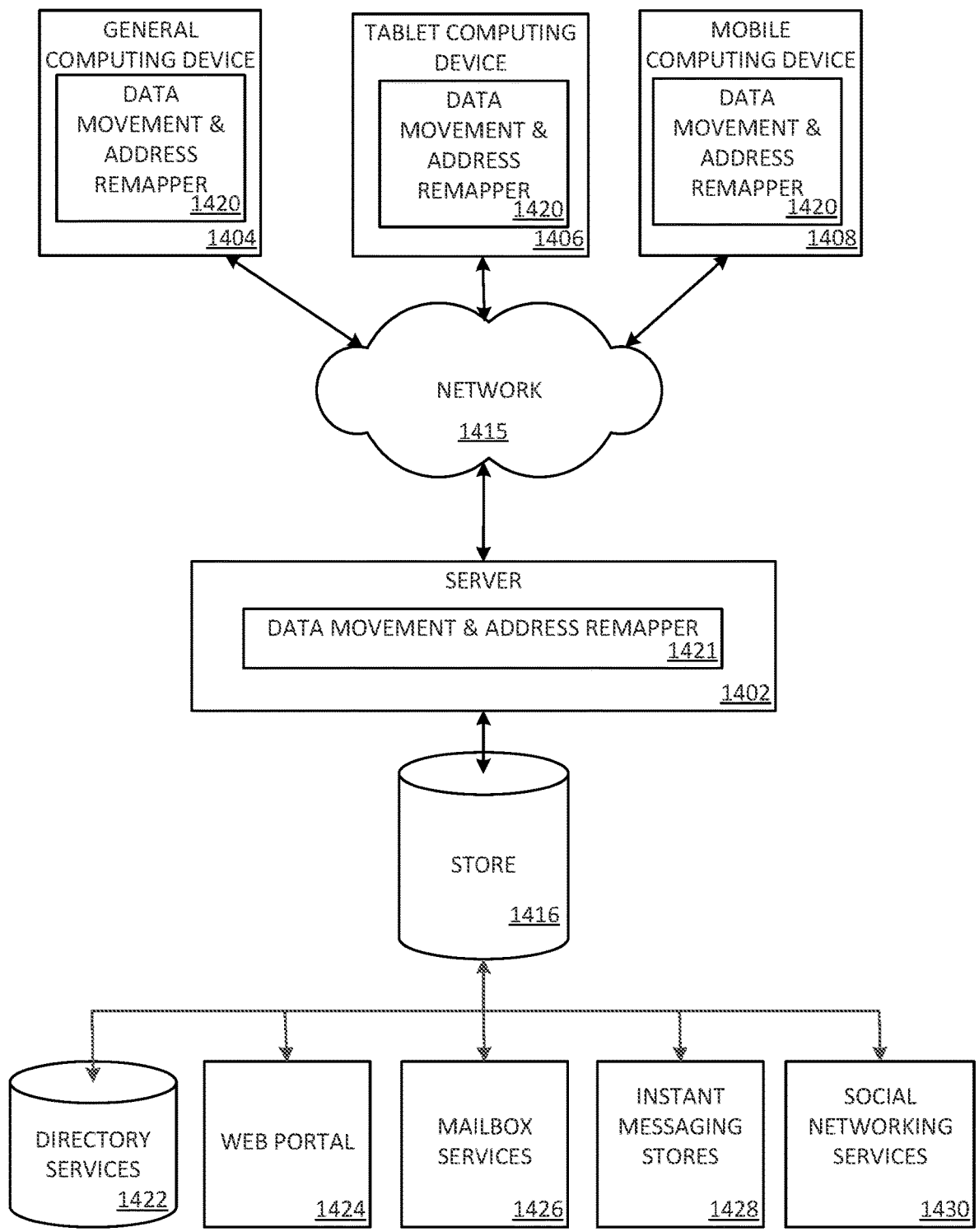
FIG. 14 illustrates one aspect of the architecture of a system for processing data.

FIG. 14 illustrates one aspect of the architecture of a system for processing data received at a computing system from a remote source, such as a personal computer 1404, tablet computing device 1406, or mobile computing device 1408, as described above. Content displayed at server device 1402 may be stored in different communication channels or other storage types. For example, various documents may be stored using a directory service 1422, a web portal 1424, a mailbox service 1426, an instant messaging store 1428, or a social networking site 1430.

A data movement and address remapper 1421 may be employed by a client that communicates with server device 1402 and may be employed by server device 1402. The server device 1402 may provide data to and from a client computing device such as a personal computer 1404, a tablet computing device 1406 and/or a mobile computing device 1408 (e.g., a smart phone) through a network 1415. By way of example, the computer system described above may be embodied in a personal computer 1404, a tablet computing device 1406 and/or a mobile computing device 1408 (e.g., a smart phone). Any of these embodiments of the computing devices may obtain content from the store 1416, in addition to receiving graphical data useable to be either pre-processed at a graphic-originating system, or post-processed at a receiving computing system.

Figure 15:
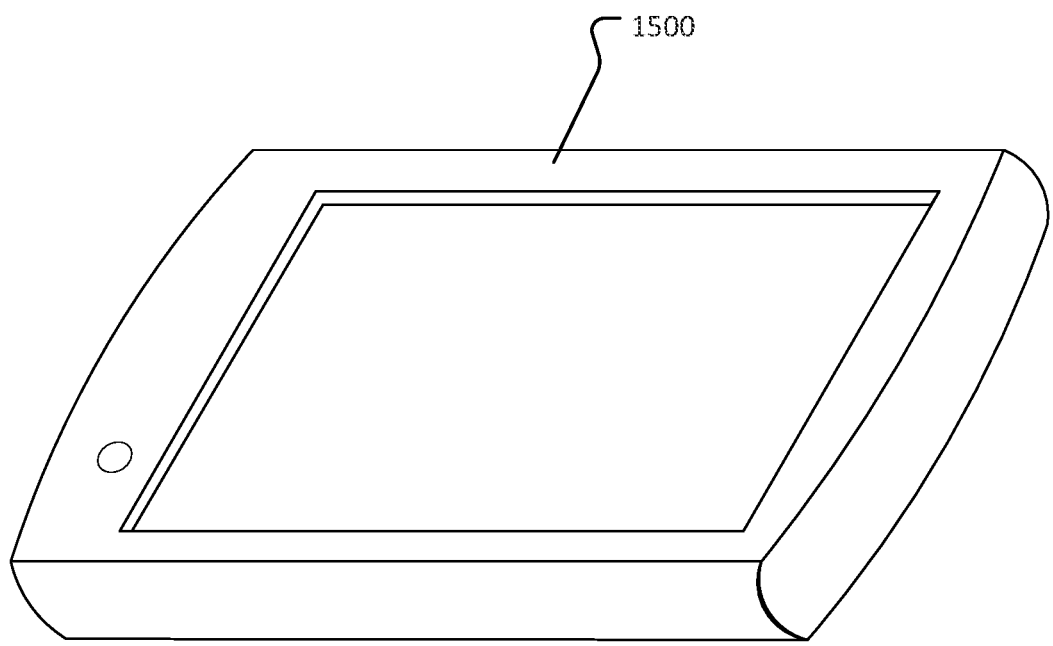
FIG. 15 illustrates an exemplary tablet computing device that may execute one or more aspects disclosed herein.

FIG. 15 illustrates an exemplary tablet computing device 1500 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A method for preventing access pattern attacks in random-access memory (RAM), the method comprising:
   providing configuration settings of memory in the RAM on a graphical user interface indicating which memory regions of the RAM have protections from the access pattern attacks;
   receiving an input indicative of a change to at least one of the configuration settings, wherein the input indicates which memory region of the memory regions of the RAM to enable or disable protection from the access pattern attacks;
   modifying, in response to receiving the change, the configuration settings based on the input;
   identifying a data request as a security risk, the data request being associated with a page table of an operating system stored in the RAM; and
   based on the configuration setting, mitigating the security risk by performing operations comprising:
      selecting a memory region, as a first memory region, from a subset of memory regions;
      copying the requested data stored in a second memory region associated with the page table entry of the page table to the first memory region;
      disassociating the first memory region from the subset of memory regions and associating the second memory region to the subset of memory regions; and
      updating the page table entry in the page table to refer to the second memory region.

2. The method of claim 1, wherein the subset of memory regions is associated with a free page pool.

3. The method of claim 1, further comprising identifying the second memory region as a potential aggressor region.

4. The method of claim 1, wherein the configuration settings include execution context identifiers associated with the RAM and a status of access pattern protection associated with each of the execution context identifiers.

5. The method of claim 4, further comprising receiving an input indicative of a change in the status of the access pattern protection associated with at least one of the execution context identifiers.

6. The method of claim 4, further comprising selectively enabling or disabling the access pattern protection associated with each of the execution context identifiers.

7. The method of claim 1, further comprising:
   selecting another memory region as a third memory region from the subset of memory regions;
   copying data stored in the first memory region to the third memory region;
   disassociating the third memory region from the subset of memory regions and associating the first memory region with the subset of memory regions; and
   updating the page entry table to refer to the third memory region.

8. The method of claim 7, wherein a virtual address of the page table entry is remapped to a new physical address associated with the third memory region.

9. The method of claim 1, further comprising periodically identifying data requests as potential security risks according to a model selected based upon the configuration setting.

10. The method of claim 1, wherein identifying the data request associated with the page table as a security risk occurs based on at least one of: a cache miss of a central processing unit, a page counter exceeding a threshold, or a page access frequency exceeding a threshold.

11. The method of claim 1, wherein identifying the data request as a security risk includes:
    generating a random number; and
    determining that the generated random number is greater than a threshold, wherein the threshold is an aggressor probability specific to the page of the operating system's page table.

12. The method of claim 1, further comprising providing an indication to a user on the graphical user interface that the security risk is at least one of detected or being mitigated.

13. A computing device for preventing access pattern attacks in random-access memory (RAM), the computing device comprising:
    a processor; and
    a memory having a plurality of instructions stored thereon that, when executed by the processor, causes the computing device to:
       provide configuration settings of memory in the RAM on a graphical user interface indicating which memory regions of the RAM have protections from the access pattern attacks;
       receive an input indicative of a change to at least one of the configuration settings, wherein the input indicates which memory region of the memory regions of the RAM to enable or disable protection from the access pattern attacks;
       modify, in response to the receipt of the change, the configuration settings based on the input;
       identify a data request as a security risk, the data request being associated with a page table of an operating system stored in the RAM; and
       based on the configuration setting, mitigate the security risk by performing operations comprising to:
          selecting memory region, as a first memory region, from a subset of memory regions;
          copying the requested data stored in a second memory region associated with the page table entry of the page table to the first memory region;
          disassociating the first memory region from the subset of memory regions and associating the second memory region to the subset of memory regions; and
          updating the page table entry in the page table to refer to the second memory region.

14. The computing device of claim 13, wherein the configuration settings include execution context identifiers associated with the RAM and a status of access pattern protection associated with each of the execution context identifiers.

15. The computing device of claim 14, wherein the plurality of instructions, when executed, further cause the computing device to receive an input indicative of a change in the status of the access pattern protection associated with at least one of the execution context identifiers.

16. The computing device of claim 13, wherein the plurality of instructions, when executed, further cause the computing device to:

select another memory region as a third memory region from the subset of memory regions;

copy data stored in the first memory region to the third memory region;

disassociate the third memory region from the subset of memory regions and associating the first memory region with the subset of memory regions; and update the page entry table to refer to the third memory region.

17. A non-transitory computer-readable medium storing instructions for preventing access pattern attacks in random-access memory (RAM), the instructions when executed by one or more processors of a computing device, cause the computing device to:

provide configuration settings of memory in the RAM on a graphical user interface indicating which memory regions of the RAM have protections from the access pattern attacks;

receive an input indicative of a change to at least one of the configuration settings, wherein the input indicates which memory region of the memory regions of the RAM to enable or disable protection from the access pattern attacks;

modify, in response to the receipt of the change, the configuration settings based on the input;

identify a data request as a security risk, the data request being associated with a page table of an operating system stored in the RAM; and based on the configuration setting, mitigate the security risk by performing operations comprising:

selecting a memory region, as a first memory region, from a subset of memory regions;

copying the requested data stored in a second memory region associated with the page table entry of the page table to the first memory region;

disassociating the first memory region from the subset of memory regions and associating the second memory region to the subset of memory regions; and updating the page table entry in the page table to refer to the second memory region.

18. The non-transitory computer-readable medium of claim 17, wherein the configuration settings include execution context identifiers associated with the RAM and a status of access pattern protection associated with each of the execution context identifiers.

19. The non-transitory computer-readable medium of claim 18, wherein the instructions when executed by the one or more processors further cause the computing device to receive an input indicative of a change in the status of the access pattern protection associated with at least one of the execution context identifiers.

20. The non-transitory computer-readable medium of claim 17, wherein the instructions when executed by the one or more processors further cause the computing device to:

select another memory region as a third memory region from the subset of memory regions;

copy data stored in the first memory region to the third memory region;

disassociate the third memory region from the subset of memory regions and associating the first memory region with the subset of memory regions; and update the page entry table to refer to the third memory region.

* * * * *